(12) United States Patent
Petite

(10) Patent No.: US 7,295,128 B2
(45) Date of Patent: *Nov. 13, 2007

(54) SMOKE DETECTION METHODS, DEVICES, AND SYSTEMS

(75) Inventor: Thomas David Petite, Douglasville, GA (US)

(73) Assignee: SIPCO, LLC, Atlanta, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 11/119,054

(22) Filed: Apr. 29, 2005

(65) Prior Publication Data

US 2005/0190055 A1    Sep. 1, 2005

Related U.S. Application Data

(63) Continuation of application No. 09/811,076, filed on Mar. 16, 2001, now Pat. No. 6,914,533, which is a continuation-in-part of application No. 09/790,150, filed on Feb. 21, 2001, now Pat. No. 6,522,974, which is a continuation-in-part of application No. 09/439,059, filed on Nov. 12, 1999, now Pat. No. 6,437,692, which is a continuation-in-part of application No. 09/412,895, filed on Oct. 5, 1999, now Pat. No. 6,218,953, which is a continuation-in-part of application No. 09/271,517, filed on Mar. 18, 1999, now abandoned, which is a continuation-in-part of application No. 09/172,554, filed on Oct. 14, 1998, now Pat. No. 6,028,522, which is a continuation-in-part of application No. 09/102,178, filed on Jun. 22, 1998, now Pat. No. 6,430,268.

(60) Provisional application No. 60/223,932, filed on Aug. 9, 2000.

(51) Int. Cl.
    *G08B 17/10*    (2006.01)

(52) U.S. Cl. ............ 340/628; 340/629; 340/630; 340/531; 340/506; 340/539.1

(58) Field of Classification Search ........ 340/628, 340/627, 630, 632, 539.1, 577, 500, 520–524, 340/531, 540, 286.02, 286.05, 506; 370/310
See application file for complete search history.

(56) References Cited

U.S. PATENT DOCUMENTS 3,665,475 A    5/1972    Gram (Continued)

FOREIGN PATENT DOCUMENTS

DE    WO 03/007264    1/2003

(Continued)

OTHER PUBLICATIONS

Brownrigg, Edwin, "User Provided Access to the Internet,", Open Access Solutions, http://web.simmons.edu/chen/nit/NIT'92/033-bro.htm, Jun. 8, 2005-Jun. 9, 2005.

(Continued)

*Primary Examiner*—Anh V. La
(74) *Attorney, Agent, or Firm*—Troutman Sanders LLP; Ryan A. Schneider; James H. Yancey, Jr.

(57) ABSTRACT

The present invention is directed to a system and method for accessing home monitoring devices remotely via a distributed wide-area network (WAN). More specifically, the present invention is directed towards a smoke detector system, which monitors for the presence of smoke and communicates the smoke condition to a remote location. The smoke detection system comprises a smoke detection device connected to a communication device. The smoke detection device outputs a signal or a change in a signal upon detection of smoke. This signal or change in signal is monitored by the communication device. The smoke condition is then communicated to the remote central location. Other embodiments are also claimed and described.

19 Claims, 14 Drawing Sheets

U.S. PATENT DOCUMENTS

| | | |
|---|---|---|
| 3,705,385 A | 12/1972 | Batz |
| 3,723,876 A | 3/1973 | Seaborn, Jr. |
| 3,742,142 A | 6/1973 | Martin |
| 3,848,231 A | 11/1974 | Wooten |
| 3,892,948 A | 7/1975 | Constable |
| 3,906,460 A | 9/1975 | Halpern |
| 3,914,692 A | 10/1975 | Seaborn, Jr. |
| 3,922,492 A | 11/1975 | Lumsden |
| 3,925,763 A | 12/1975 | Wadwhani et al. |
| 4,025,315 A | 5/1977 | Mazelli |
| 4,056,684 A | 11/1977 | Lindstrom |
| 4,058,672 A | 11/1977 | Crager et al. |
| 4,083,003 A | 4/1978 | Haemmig |
| 4,120,452 A | 10/1978 | Kimura et al. |
| 4,124,839 A | 11/1978 | Cohen |
| 4,135,181 A | 1/1979 | Bogacki et al. |
| 4,204,195 A | 5/1980 | Bogacki |
| 4,213,119 A | 7/1980 | Ward et al. |
| 4,277,837 A | 7/1981 | Stuckert |
| 4,354,181 A | 10/1982 | Spletzer |
| 4,396,910 A | 8/1983 | Enemark et al. |
| 4,396,915 A | 8/1983 | Farnsworth et al. |
| 4,417,450 A | 11/1983 | Morgan, Jr. et al. |
| 4,436,957 A | 3/1984 | Mazza |
| 4,446,454 A | 5/1984 | Pyle |
| 4,454,414 A | 6/1984 | Benton |
| 4,468,656 A | 8/1984 | Clifford et al. |
| 4,488,152 A | 12/1984 | Arnason et al. |
| 4,495,496 A | 1/1985 | Miller, III |
| 4,551,719 A | 11/1985 | Carlin et al. |
| 4,611,198 A | 9/1986 | Levinson et al. |
| 4,621,263 A | 11/1986 | Takenaka et al. |
| 4,630,035 A | 12/1986 | Stahl et al. |
| 4,631,357 A | 12/1986 | Grunig |
| 4,670,739 A | 6/1987 | Kelly, Jr. |
| 4,707,852 A | 11/1987 | Jahr et al. |
| 4,731,810 A | 3/1988 | Watkins |
| 4,742,296 A | 5/1988 | Petr et al. |
| 4,757,185 A | 7/1988 | Onishi |
| 4,800,543 A | 1/1989 | Lyndon-James et al. |
| 4,825,457 A | 4/1989 | Lebowitz |
| 4,829,561 A | 5/1989 | Matheny |
| 4,849,815 A | 7/1989 | Streck |
| 4,851,654 A | 7/1989 | Nitta |
| 4,856,046 A | 8/1989 | Steck et al. |
| 4,857,912 A | 8/1989 | Everett, Jr. et al. |
| 4,875,231 A | 10/1989 | Hara et al. |
| 4,884,132 A | 11/1989 | Morris et al. |
| 4,897,644 A | 1/1990 | Hirano |
| 4,906,828 A | 3/1990 | Halpern |
| 4,908,769 A | 3/1990 | Vaughan et al. |
| 4,918,690 A | 4/1990 | Markkula, Jr. et al. |
| 4,918,995 A | 4/1990 | Pearman et al. |
| 4,928,299 A | 5/1990 | Tansky et al. |
| 4,940,976 A | 7/1990 | Gastouniotis et al. |
| 4,949,077 A | 8/1990 | Mbuthia |
| 4,952,928 A | 8/1990 | Carroll et al. |
| 4,962,496 A | 10/1990 | Vercellotti et al. |
| 4,967,366 A | 10/1990 | Kaehler |
| 4,968,970 A | 11/1990 | LaPorte |
| 4,968,978 A | 11/1990 | Stolarczyk |
| 4,972,504 A | 11/1990 | Daniel, Jr. et al. |
| 4,973,957 A | 11/1990 | Shimizu et al. |
| 4,973,970 A | 11/1990 | Reeser |
| 4,977,612 A | 12/1990 | Wilson |
| 4,980,907 A | 12/1990 | Raith et al. |
| 4,989,230 A | 1/1991 | Gillig et al. |
| 4,991,008 A | 2/1991 | Nama |
| 4,998,095 A | 3/1991 | Shields |
| 4,999,607 A | 3/1991 | Evans |
| 5,032,833 A | 7/1991 | Laporte |
| 5,038,372 A | 8/1991 | Elms et al. |
| 5,055,851 A | 10/1991 | Sheffer |
| 5,057,814 A | 10/1991 | Onan et al. |
| 5,061,997 A | 10/1991 | Rea et al. |
| 5,086,391 A | 2/1992 | Chambers |
| 5,091,713 A | 2/1992 | Horne et al. |
| 5,111,199 A | 5/1992 | Tomoda et al. |
| 5,113,183 A | 5/1992 | Mizuno et al. |
| 5,113,184 A | 5/1992 | Katayama |
| 5,115,224 A | 5/1992 | Kostusiak et al. |
| 5,115,433 A | 5/1992 | Baran et al. |
| 5,124,624 A | 6/1992 | de Vries et al. |
| 5,128,855 A | 7/1992 | Hilber et al. |
| 5,130,519 A | 7/1992 | Bush et al. |
| 5,131,038 A | 7/1992 | Puhl et al. |
| 5,134,650 A | 7/1992 | Blackmon |
| 5,136,285 A | 8/1992 | Okuyama |
| 5,155,481 A | 10/1992 | Brennan, Jr. et al. |
| 5,159,317 A | 10/1992 | Brav |
| 5,162,776 A | 11/1992 | Bushnell et al. |
| 5,177,342 A | 1/1993 | Adams |
| 5,189,287 A | 2/1993 | Parienti |
| 5,191,192 A | 3/1993 | Takahira et al. |
| 5,191,326 A | 3/1993 | Montgomery |
| 5,193,111 A | 3/1993 | Matty et al. |
| 5,195,018 A | 3/1993 | Kwon et al. |
| 5,197,095 A | 3/1993 | Bonnet et al. |
| 5,200,735 A | 4/1993 | Hines |
| 5,204,670 A | 4/1993 | Stinton |
| 5,212,645 A | 5/1993 | Wildes et al. |
| 5,216,502 A | 6/1993 | Katz |
| 5,221,838 A | 6/1993 | Gutman et al. |
| 5,223,844 A | 6/1993 | Mansell et al. |
| 5,231,658 A | 7/1993 | Eftechiou |
| 5,235,630 A | 8/1993 | Moody et al. |
| 5,239,575 A | 8/1993 | White et al. |
| 5,241,410 A | 8/1993 | Streck et al. |
| 5,243,338 A | 9/1993 | Brennan, Jr. et al. |
| 5,245,633 A | 9/1993 | Schwartz et al. |
| 5,252,967 A | 10/1993 | Brennan et al. |
| 5,253,167 A | 10/1993 | Yoshida et al. |
| 5,265,150 A | 11/1993 | Helmkamp et al. |
| 5,265,162 A | 11/1993 | Bush et al. |
| 5,266,782 A | 11/1993 | Alanara et al. |
| 5,272,747 A | 12/1993 | Meads |
| 5,282,204 A | 1/1994 | Shpancer et al. |
| 5,282,250 A | 1/1994 | Dent et al. |
| 5,289,165 A | 2/1994 | Belin |
| 5,295,154 A | 3/1994 | Meier et al. |
| 5,305,370 A | 4/1994 | Kearns et al. |
| 5,315,645 A | 5/1994 | Matheny |
| 5,317,309 A | 5/1994 | Vercellotti et al. |
| 5,319,364 A | 6/1994 | Waraksa et al. |
| 5,319,698 A | 6/1994 | Glidewell et al. |
| 5,319,711 A | 6/1994 | Servi |
| 5,323,384 A | 6/1994 | Norwood et al. |
| 5,325,429 A | 6/1994 | Kurgan |
| 5,331,318 A | 7/1994 | Montgomery |
| 5,334,974 A | 8/1994 | Simms et al. |
| 5,343,493 A | 8/1994 | Karimullah |
| 5,345,231 A | 9/1994 | Koo et al. |
| 5,347,263 A | 9/1994 | Carroll et al. |
| 5,354,974 A | 10/1994 | Eisenberg |
| 5,355,513 A | 10/1994 | Clarke et al. |
| 5,365,217 A | 11/1994 | Toner |
| 5,371,736 A | 12/1994 | Evan |
| 5,382,778 A | 1/1995 | Takahira et al. |
| 5,383,134 A | 1/1995 | Wrzesinski |
| 5,406,619 A | 4/1995 | Akhteruzzman et al. |
| 5,412,192 A | 5/1995 | Hoss |
| 5,412,760 A | 5/1995 | Peitz |
| 5,416,475 A | 5/1995 | Tolbert et al. |
| 5,416,725 A | 5/1995 | Pacheco et al. |

| | | | | | |
|---|---|---|---|---|---|
| 5,418,812 A | 5/1995 | Reyes et al. | 5,659,303 A | 8/1997 | Adair, Jr. |
| 5,424,708 A | 6/1995 | Ballesty et al. | 5,668,876 A | 9/1997 | Falk et al. |
| 5,432,507 A | 7/1995 | Mussino et al. | 5,673,252 A | 9/1997 | Johnson et al. |
| 5,438,329 A | 8/1995 | Gastouniotis et al. | 5,673,304 A | 9/1997 | Connor et al. |
| 5,439,414 A | 8/1995 | Jacob | 5,673,305 A | 9/1997 | Ross |
| 5,442,553 A | 8/1995 | Parrillo | 5,682,139 A | 10/1997 | Pradeep et al. |
| 5,445,287 A | 8/1995 | Center et al. | 5,682,476 A | 10/1997 | Tapperson et al. |
| 5,451,929 A | 9/1995 | Adelman et al. | 5,689,229 A | 11/1997 | Chaco et al. |
| 5,451,938 A | 9/1995 | Brennan, Jr. | 5,699,328 A | 12/1997 | Ishizaki et al. |
| 5,452,344 A | 9/1995 | Larson | 5,701,002 A | 12/1997 | Oishi et al. |
| 5,465,401 A | 11/1995 | Thompson | 5,704,046 A | 12/1997 | Hogan |
| 5,467,074 A | 11/1995 | Pedtke | 5,704,517 A | 1/1998 | Lancaster, Jr. |
| 5,467,082 A | 11/1995 | Sanderson | 5,706,191 A | 1/1998 | Bassett et al. |
| 5,467,345 A | 11/1995 | Cutler et al. | 5,706,976 A | 1/1998 | Purkey |
| 5,468,948 A | 11/1995 | Koenck et al. | 5,708,223 A | 1/1998 | Wyss |
| 5,471,201 A | 11/1995 | Cerami et al. | 5,708,655 A | 1/1998 | Toth |
| 5,473,322 A | 12/1995 | Carney | 5,712,619 A | 1/1998 | Simkin |
| 5,475,689 A | 12/1995 | Kay et al. | 5,712,980 A | 1/1998 | Beeler et al. |
| 5,481,259 A | 1/1996 | Bane | 5,714,931 A | 2/1998 | Petite et al. |
| 5,481,532 A | 1/1996 | Hassan et al. | 5,717,718 A | 2/1998 | Rowsell et al. |
| 5,484,997 A | 1/1996 | Haynes | 5,726,634 A | 3/1998 | Hess et al. |
| 5,493,273 A | 2/1996 | Smurlo et al. | 5,726,984 A | 3/1998 | Kubler et al. |
| 5,493,287 A | 2/1996 | Bane | 5,732,074 A | 3/1998 | Spaur et al. |
| 5,506,837 A | 4/1996 | Sollner et al. | 5,732,078 A | 3/1998 | Arango |
| 5,509,073 A | 4/1996 | Monnin | 5,736,965 A | 4/1998 | Mosebrook et al. |
| 5,513,244 A | 4/1996 | Joao et al. | 5,740,232 A | 4/1998 | Pailles et al. |
| 5,515,419 A | 5/1996 | Sheffer | 5,742,509 A | 4/1998 | Goldberg et al. |
| 5,517,188 A | 5/1996 | Carroll et al. | 5,745,849 A | 4/1998 | Britton |
| 5,522,089 A | 5/1996 | Kikinis et al. | 5,748,104 A | 5/1998 | Argyroudis et al. |
| 5,528,215 A | 6/1996 | Siu et al. | 5,748,619 A | 5/1998 | Meier |
| 5,539,825 A | 7/1996 | Akiyama et al. | 5,754,111 A | 5/1998 | Garcia |
| 5,541,938 A | 7/1996 | Di Zenzo et al. | 5,754,227 A | 5/1998 | Fukuoka |
| 5,542,100 A | 7/1996 | Hatakeyama | 5,757,783 A | 5/1998 | Eng et al. |
| 5,544,036 A | 8/1996 | Brown, Jr. et al. | 5,757,788 A | 5/1998 | Tatsumi et al. |
| 5,544,784 A | 8/1996 | Malaspina | 5,761,083 A | 6/1998 | Brown, Jr. et al. |
| 5,548,632 A | 8/1996 | Walsh et al. | 5,764,742 A | 6/1998 | Howard et al. |
| 5,550,358 A | 8/1996 | Tait et al. | 5,771,274 A | 6/1998 | Harris |
| 5,550,359 A | 8/1996 | Bennett | 5,774,052 A | 6/1998 | Hamm et al. |
| 5,550,535 A | 8/1996 | Park | 5,781,143 A | 7/1998 | Rossin |
| 5,553,094 A | 9/1996 | Johnson et al. | 5,790,644 A | 8/1998 | Kikinis |
| 5,555,258 A | 9/1996 | Snelling et al. | 5,790,662 A | 8/1998 | Valerij et al. |
| 5,555,286 A | 9/1996 | Tendler | 5,790,938 A | 8/1998 | Talarmo |
| 5,562,537 A | 10/1996 | Zver et al. | 5,796,727 A | 8/1998 | Harrison et al. |
| 5,565,857 A | 10/1996 | Lee | 5,798,964 A | 8/1998 | Shimizu et al. |
| 5,568,535 A | 10/1996 | Sheffer et al. | 5,801,643 A | 9/1998 | Williams et al. |
| 5,572,438 A | 11/1996 | Ehlers et al. | 5,815,505 A | 9/1998 | Mills |
| 5,573,181 A | 11/1996 | Ahmed | 5,818,822 A | 10/1998 | Thomas et al. |
| 5,574,111 A | 11/1996 | Brichta et al. | 5,822,273 A | 10/1998 | Bary et al. |
| 5,583,850 A | 12/1996 | Snodgrass et al. | 5,822,544 A | 10/1998 | Chaco et al. |
| 5,587,705 A | 12/1996 | Morris | 5,826,195 A | 10/1998 | Westerlage et al. |
| 5,589,878 A | 12/1996 | Cortjens et al. | 5,828,044 A | 10/1998 | Jun et al. |
| 5,590,038 A | 12/1996 | Pitroda | 5,832,057 A | 11/1998 | Furman |
| 5,590,179 A | 12/1996 | Shincovich et al. | 5,838,223 A | 11/1998 | Gallant et al. |
| 5,592,491 A | 1/1997 | Dinks | 5,838,237 A | 11/1998 | Revell et al. |
| 5,594,431 A | 1/1997 | Sheppard et al. | 5,838,812 A | 11/1998 | Pare, Jr. et al. |
| 5,602,843 A | 2/1997 | Gray | 5,841,118 A | 11/1998 | East et al. |
| 5,604,414 A | 2/1997 | Milligan et al. | 5,841,764 A | 11/1998 | Roderique et al. |
| 5,604,869 A | 2/1997 | Mincher et al. | 5,842,976 A | 12/1998 | Williamson |
| 5,606,361 A | 2/1997 | Davidsohn et al. | 5,844,808 A | 12/1998 | Konsmo et al. |
| 5,608,786 A | 3/1997 | Gordon | 5,845,230 A | 12/1998 | Lamberson |
| 5,613,620 A | 3/1997 | Center et al. | 5,852,658 A | 12/1998 | Knight et al. |
| 5,615,277 A | 3/1997 | Hoffman | 5,854,994 A | 12/1998 | Canada et al. |
| 5,619,192 A | 4/1997 | Ayala | 5,862,201 A | 1/1999 | Sands |
| 5,625,410 A | 4/1997 | Washino et al. | 5,864,772 A | 1/1999 | Alvarado et al. |
| 5,628,050 A | 5/1997 | McGraw et al. | 5,873,043 A | 2/1999 | Comer |
| 5,629,687 A | 5/1997 | Sutton et al. | 5,874,903 A | 2/1999 | Shuey et al. |
| 5,629,875 A | 5/1997 | Adair, Jr. | 5,880,677 A | 3/1999 | Lestician |
| 5,630,209 A | 5/1997 | Wizgall et al. | 5,884,184 A | 3/1999 | Sheffer |
| 5,631,554 A | 5/1997 | Briese et al. | 5,884,271 A | 3/1999 | Pitroda |
| 5,644,294 A | 7/1997 | Ness | 5,886,333 A | 3/1999 | Miyake |
| 5,655,219 A | 8/1997 | Jusa et al. | 5,889,468 A | 3/1999 | Banga |
| 5,657,389 A | 8/1997 | Houvener | 5,892,690 A | 4/1999 | Boatman et al. |
| 5,659,300 A | 8/1997 | Dresselhuys et al. | 5,892,758 A | 4/1999 | Argyroudis |

| | | | | | |
|---|---|---|---|---|---|
| 5,892,924 A | 4/1999 | Lyon et al. | 6,121,885 A | 9/2000 | Masone et al. |
| 5,896,097 A | 4/1999 | Cardozo | 6,124,806 A | 9/2000 | Cunningham et al. |
| 5,897,607 A | 4/1999 | Jenney et al. | 6,127,917 A | 10/2000 | Tuttle |
| 5,898,369 A | 4/1999 | Godwin | 6,128,551 A | 10/2000 | Davis et al. |
| 5,905,438 A | 5/1999 | Weiss et al. | 6,130,622 A | 10/2000 | Hussey et al. |
| 5,907,291 A | 5/1999 | Chen et al. | 6,133,850 A | 10/2000 | Moore |
| 5,907,491 A | 5/1999 | Canada et al. | 6,137,423 A | 10/2000 | Glorioso et al. |
| 5,907,540 A | 5/1999 | Hayashi | 6,140,975 A | 10/2000 | Cohen |
| 5,907,807 A | 5/1999 | Chavez, Jr. et al. | 6,141,347 A | 10/2000 | Shaughnessy et al. |
| 5,914,672 A | 6/1999 | Glorioso et al. | 6,150,936 A | 11/2000 | Addy |
| 5,914,673 A | 6/1999 | Jennings et al. | 6,150,955 A | 11/2000 | Tracy et al. |
| 5,917,405 A | 6/1999 | Joao | 6,157,464 A | 12/2000 | Bloomfield et al. |
| 5,917,629 A | 6/1999 | Hortensius et al. | 6,157,824 A | 12/2000 | Bailey |
| 5,923,269 A | 7/1999 | Shuey et al. | 6,163,276 A | 12/2000 | Irving et al. |
| 5,926,103 A | 7/1999 | Petite | 6,172,616 B1 | 1/2001 | Johnson et al. |
| 5,926,529 A | 7/1999 | Hache et al. | 6,174,205 B1 | 1/2001 | Madsen et al. |
| 5,926,531 A | 7/1999 | Petite | 6,175,922 B1 | 1/2001 | Wang |
| 5,933,073 A | 8/1999 | Shuey | 6,177,883 B1 | 1/2001 | Jennetti et al. |
| 5,941,363 A | 8/1999 | Partyka et al. | 6,181,255 B1 | 1/2001 | Crimmins et al. |
| 5,941,955 A | 8/1999 | Wilby et al. | 6,181,284 B1 | 1/2001 | Madsen et al. |
| 5,948,040 A | 9/1999 | DeLorme et al. | 6,181,981 B1 | 1/2001 | Varga et al. |
| 5,949,779 A | 9/1999 | Mostafa et al. | 6,188,354 B1 | 2/2001 | Soliman et al. |
| 5,949,799 A | 9/1999 | Grivna et al. | 6,192,390 B1 | 2/2001 | Berger et al. |
| 5,953,371 A | 9/1999 | Roswell et al. | 6,198,390 B1 | 3/2001 | Schlager et al. |
| 5,955,718 A | 9/1999 | Levasseur et al. | 6,199,068 B1 | 3/2001 | Carpenter |
| 5,960,074 A | 9/1999 | Clark | 6,208,266 B1 | 3/2001 | Lyons et al. |
| 5,963,146 A | 10/1999 | Johnson et al. | 6,215,404 B1 | 4/2001 | Morales |
| 5,963,452 A | 10/1999 | Etoh et al. | 6,218,953 B1 | 4/2001 | Petite |
| 5,963,650 A | 10/1999 | Simionescu et al. | 6,218,983 B1 | 4/2001 | Kerry et al. |
| 5,969,608 A | 10/1999 | Sojdehei et al. | 6,219,409 B1 | 4/2001 | Smith et al. |
| 5,973,756 A | 10/1999 | Erlin | 6,229,439 B1 | 5/2001 | Tice |
| 5,978,364 A | 11/1999 | Melnik | 6,233,327 B1 | 5/2001 | Petite |
| 5,978,371 A | 11/1999 | Mason, Jr. et al. | 6,234,111 B1 | 5/2001 | Ulman et al. |
| 5,986,574 A | 11/1999 | Colton | 6,236,332 B1 | 5/2001 | Conkright et al. |
| 5,987,421 A | 11/1999 | Chuang | 6,243,010 B1 | 6/2001 | Addy et al. |
| 5,991,639 A | 11/1999 | Rautiola et al. | 6,246,677 B1 | 6/2001 | Nap et al. |
| 5,994,892 A | 11/1999 | Turino et al. | 6,249,516 B1 | 6/2001 | Brownrigg et al. |
| 5,995,592 A | 11/1999 | Shirai et al. | 6,259,369 B1 | 7/2001 | Monico |
| 5,995,593 A | 11/1999 | Cho | 6,286,756 B1 | 9/2001 | Stinson et al. |
| 5,997,170 A | 12/1999 | Brodbeck | 6,288,634 B1 | 9/2001 | Weiss et al. |
| 5,999,094 A | 12/1999 | Nilssen | 6,288,641 B1 | 9/2001 | Carsais |
| 6,005,759 A | 12/1999 | Hart et al. | 6,295,291 B1 | 9/2001 | Larkins |
| 6,005,963 A | 12/1999 | Bolle et al. | 6,301,514 B1 | 10/2001 | Canada et al. |
| 6,021,664 A | 2/2000 | Granato et al. | 6,305,602 B1 | 10/2001 | Grabowski et al. |
| 6,023,223 A | 2/2000 | Baxter, Jr. | 6,308,111 B1 | 10/2001 | Koga |
| 6,028,522 A | 2/2000 | Petite | 6,311,167 B1 | 10/2001 | Davis et al. |
| 6,028,857 A | 2/2000 | Poor | 6,314,169 B1 | 11/2001 | Schelberg, Jr. et al. |
| 6,031,455 A | 2/2000 | Grube et al. | 6,317,029 B1 | 11/2001 | Fleeter |
| 6,032,197 A | 2/2000 | Birdwell et al. | 6,334,117 B1 | 12/2001 | Covert et al. |
| 6,035,266 A | 3/2000 | Williams et al. | 6,351,223 B1 | 2/2002 | DeWeerd et al. |
| 6,036,086 A | 3/2000 | Sizer, II et al. | 6,356,205 B1 | 3/2002 | Salvo et al. |
| 6,038,491 A | 3/2000 | McGarry et al. | 6,357,034 B1 | 3/2002 | Muller et al. |
| 6,044,062 A | 3/2000 | Brownrigg et al. | 6,362,745 B1 | 3/2002 | Davis |
| 6,054,920 A | 4/2000 | Smith et al. | 6,363,057 B1 | 3/2002 | Ardalan et al. |
| 6,060,994 A | 5/2000 | Chen | 6,366,217 B1 | 4/2002 | Cunningham et al. |
| 6,061,604 A | 5/2000 | Russ et al. | 6,369,769 B1 | 4/2002 | Nap et al. |
| 6,064,318 A | 5/2000 | Kirchner, III et al. | 6,370,489 B1 | 4/2002 | Williams et al. |
| 6,067,017 A | 5/2000 | Stewart et al. | 6,373,399 B1 | 4/2002 | Johnson et al. |
| 6,067,030 A | 5/2000 | Burnett et al. | 6,380,851 B1 | 4/2002 | Gilbert et al. |
| 6,069,886 A | 5/2000 | Ayerst et al. | 6,384,722 B1 | 5/2002 | Williams |
| 6,073,169 A | 6/2000 | Shuey et al. | 6,393,341 B1 | 5/2002 | Lawrence et al. |
| 6,073,266 A | 6/2000 | Ahmed et al. | 6,393,381 B1 | 5/2002 | Williams et al. |
| 6,073,840 A | 6/2000 | Marion | 6,393,382 B1 | 5/2002 | Williams et al. |
| 6,075,451 A | 6/2000 | Lebowitz et al. | 6,396,839 B1 | 5/2002 | Ardalan et al. |
| 6,087,957 A | 7/2000 | Gray | 6,400,819 B1 | 6/2002 | Nakano et al. |
| 6,088,659 A | 7/2000 | Kelley et al. | 6,401,081 B1 | 6/2002 | Montgomery et al. |
| 6,094,622 A | 7/2000 | Hubbard et al. | 6,411,889 B1 | 6/2002 | Mizunuma et al. |
| 6,100,817 A | 8/2000 | Mason, Jr. et al. | 6,415,245 B2 | 7/2002 | Williams et al. |
| 6,101,427 A | 8/2000 | Yang | 6,422,464 B1 | 7/2002 | Terranova |
| 6,101,445 A | 8/2000 | Alvarado et al. | 6,424,270 B1 | 7/2002 | Ali |
| 6,112,983 A | 9/2000 | D'Anniballe et al. | 6,424,931 B1 | 7/2002 | Sigmar et al. |
| 6,119,076 A | 9/2000 | Williams et al. | 6,430,268 B1 | 8/2002 | Petite |
| 6,121,593 A | 9/2000 | Mansbery et al. | 6,431,439 B1 | 8/2002 | Suer et al. |

| | | |
|---|---|---|
| 6,437,692 B1 | 8/2002 | Petite et al. |
| 6,438,575 B1 | 8/2002 | Khan et al. |
| 6,445,291 B2 | 9/2002 | Addy et al. |
| 6,456,960 B1 | 9/2002 | Williams et al. |
| 6,457,038 B1 | 9/2002 | Defosse |
| 6,462,644 B1 | 10/2002 | Howell et al. |
| 6,462,672 B1 | 10/2002 | Besson |
| 6,477,558 B1 | 11/2002 | Irving et al. |
| 6,483,290 B1 | 11/2002 | Hemminger et al. |
| 6,484,939 B1 | 11/2002 | Blaeuer |
| 6,489,884 B1 | 12/2002 | Lamberson et al. |
| 6,491,828 B1 | 12/2002 | Sivavec et al. |
| 6,492,910 B1 | 12/2002 | Ragle et al. |
| 6,504,357 B1 | 1/2003 | Hemminger et al. |
| 6,507,794 B1 | 1/2003 | Hubbard et al. |
| 6,509,722 B2 | 1/2003 | Lopata |
| 6,519,568 B1 | 2/2003 | Harvey et al. |
| 6,538,577 B1 | 3/2003 | Ehrke et al. |
| 6,542,076 B1 | 4/2003 | Joao |
| 6,542,077 B2 | 4/2003 | Joao |
| 6,543,690 B2 | 4/2003 | Leydier et al. |
| 6,560,223 B1 | 5/2003 | Egan et al. |
| 6,574,603 B1 | 6/2003 | Dickson et al. |
| 6,600,726 B1 | 7/2003 | Nevo et al. |
| 6,608,551 B1 | 8/2003 | Anderson et al. |
| 6,618,578 B1 | 9/2003 | Petite |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B2 | 11/2003 | Johnson et al. |
| 6,671,586 B2 | 12/2003 | Davis et al. |
| 6,674,403 B2 | 1/2004 | Gray et al. |
| 6,678,255 B1 | 1/2004 | Kuriyan |
| 6,678,285 B1 | 1/2004 | Garg |
| 6,731,201 B1 | 5/2004 | Bailey et al. |
| 6,735,630 B1 | 5/2004 | Gelvin et al. |
| 6,747,557 B1 | 6/2004 | Petite et al. |
| 6,771,981 B1 | 8/2004 | Zalewski et al. |
| 6,891,838 B1 | 5/2005 | Petite |
| 6,914,533 B2 * | 7/2005 | Petite .................. 340/628 |
| 6,914,893 B2 | 7/2005 | Petite |
| 6,959,550 B2 | 11/2005 | Freeman et al. |
| 2001/0002210 A1 | 5/2001 | Petite |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0013679 A1 | 1/2002 | Petite |
| 2002/1112323 | 1/2002 | Petite |
| 2002/0019725 A1 | 2/2002 | Petite |
| 2002/0027504 A1 | 3/2002 | Petite |
| 2002/0031101 A1 | 3/2002 | Petite |
| 2002/0032746 A1 | 3/2002 | Lazaridis |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0098858 A1 | 7/2002 | Struhsaker |
| 2002/0109607 A1 | 8/2002 | Cumeralto et al. |
| 2002/0158774 A1 | 10/2002 | Johnson et al. |
| 2002/0163442 A1 | 11/2002 | Fischer |
| 2002/0169643 A1 | 11/2002 | Petite |
| 2002/0193144 A1 | 12/2002 | Belski et al. |
| 2003/0001754 A1 | 1/2003 | Johnson et al. |
| 2003/0028632 A1 | 2/2003 | Davis |
| 2003/0030926 A1 | 2/2003 | Aguren et al. |
| 2003/0034900 A1 | 2/2003 | Han |
| 2003/0036822 A1 | 2/2003 | Davis et al. |
| 2003/0046377 A1 | 3/2003 | Daum et al. |
| 2003/0058818 A1 | 3/2003 | Wilker et al. |
| 2003/0069002 A1 | 4/2003 | Hunter et al. |
| 2003/0078029 A1 | 4/2003 | Petite |
| 2003/0093484 A1 | 5/2003 | Petite |
| 2003/0133473 A1 | 7/2003 | Manis et al. |
| 2003/0169710 A1 | 9/2003 | Fan et al. |
| 2003/0210638 A1 | 11/2003 | Yoo |
| 2004/0053639 A1 | 3/2004 | Petite |
| 2004/0183687 A1 | 9/2004 | Petite |
| 2005/0190055 A1 | 9/2005 | Petite |
| 2005/0195768 A1 | 9/2005 | Petite |
| 2005/0195775 A1 | 9/2005 | Petite |

FOREIGN PATENT DOCUMENTS

| | | |
|---|---|---|
| DE | WO03/007264 | 1/2003 |
| EP | 0718954 | 6/1996 |
| EP | 07144 | 2/1998 |
| EP | 1096454 | 5/2001 |
| FR | 2817110 | 5/2002 |
| FR | WO 02/052521 | 7/2002 |
| FR | WO02/052521 | 7/2002 |
| GB | 2229302 | 9/1990 |
| GB | 2247761 | 3/1992 |
| GB | 2262683 | 6/1993 |
| GB | 2297663 | 8/1996 |
| GB | 2310779 | 9/1997 |
| GB | 2326002 | 12/1998 |
| GB | 2336272 | 10/1999 |
| GB | 2352004 | 1/2001 |
| GB | 2352590 | 1/2001 |
| JP | 60261288 | 12/1985 |
| JP | 01255100 | 10/1989 |
| JP | 11353573 | 12/1999 |
| JP | 200113590 | 4/2000 |
| JP | 2001063425 | 3/2001 |
| JP | 2001088401 | 4/2001 |
| JP | 2001309069 | 11/2001 |
| JP | 2001319284 | 11/2001 |
| JP | 2001357483 | 12/2001 |
| JP | 2002007672 | 1/2002 |
| JP | 2002007826 | 1/2002 |
| JP | 2002085354 | 3/2002 |
| JP | 2002171354 | 6/2002 |
| KR | 2001025431 | 4/2001 |
| NO | 03/021877 | 3/2003 |
| NO | WO 03/021877 | 3/2003 |
| WO | WO 90/13197 | 11/1990 |
| WO | WO 98/00056 | 1/1998 |
| WO | WO 98/37528 | 8/1998 |
| WO | WO 99/13426 | 3/1999 |
| WO | 200023956 A1 | 4/2000 |
| WO | WO 01/15114 | 8/2000 |
| WO | WO 01/24109 | 4/2001 |
| WO | WO 02/08725 | 1/2002 |
| WO | WO 02/08866 | 1/2002 |
| WO | WO 02/052521 | 7/2002 |
| WO | WO 03/007264 | 1/2003 |
| WO | WO 03/021877 | 3/2003 |

OTHER PUBLICATIONS

Khan, Robert E., "The Organization of Computer resources into Packet Radio Network," IEEE, Jan. 1977, Vol. Com-25 No. 1, pp. 169-178.

Westcott, Jill A., "Issues in Distributed Routing for Mobile Packet Radio Network," IEEE 1982, pp. 233-238.

Khan, Robert E., "The Organization of Computer Resources into a Packet Radio network," IEEE Transactions on Communications, Jan. 1977, Vol. Com-25 No. 1, pp. 169-178.

Westcott, Jill A., "Issues in Distributed Routing for Mobile Packet Radio Network," IEEE 1982, pp. 233-238.

Westcott, Jil et al., "A Distributed Routing Design For A Broadcoast Environment", IEEE 1982, pp. 10.4.0-10.4.5.

Kahn, Robert E. et al., "Advances In Packet Radio Technology", IEEE Nov. 1978, vol. 66, No. 11, pp. 1468-1496.

Frankel, Michael S., "Packet Radios Provide Link for Distributed, Survivable C3 in Post-Attack Scenarios", MSN Jun. 1983.

Lauer, Greg et al., "Survivable Protocols for Large Scale Packet Radio Networks", IEEE 1984, pp. 15.1-1 to 15.1-4.

Gower, Neil et al., "Congestion Control Using Pacing in a Packet Radio Network", IEEE 1982, pp. 23.1-1 to 23.1-6.

MacGregor, William et al., "Multiple Control Stations in Packet Radio Networks", IEEE 1982, pp. 10.3-1 to 10.3-5.

Shacham, Nachum et al., "Future Directions in Packet Radio Technology", IEEE 1985, pp. 93-98.

Jubin, John, "Current Packet Radio Network Protocols", IEEE 1985, pp. 86-92.

Westcott, Jill A., Issues in Distributed Routing for Mobile Packet Radio Network, IEEE 1982, pp. 233 238.

Lynch, Clifford A. et al., Packet Radio Networks, "Architectures, Protocols, Technologies and Applications," 1982.

* cited by examiner

FIG. 14    MESSAGE STRUCTURE

| To Addr. (1-6) | From Addr. (6) | Pkt. No. (1) | Pkt. Max. (1) | Pkt. Lngth. (1) | Cmd. (1) | Data (0-109) | CkH (1) | CkL (1) |
|---|---|---|---|---|---|---|---|---|

Sample Messages 1500

Central Server to Personal Transceiver - Broadcast Message - FF (Emergency)

Byte Count = 12

| To Addr (FF) | From Addr. (12345678) | Pkt. No. (00) | Pkt. Max. (00) | Pkt. Lngth. (0C) | Cmd. (FF) | CkH (02) | CkL (9E) |
|---|---|---|---|---|---|---|---|

---

First Transceiver to Repeater (Transceiver)
Broadcast Message - FF (Emergency) 1510

Byte Count = 17

| To Addr. (F0) | From Addr. (12345678) | Pkt. No. (00) | Pkt. Max. (00) | Pkt. Lngth. (11) | Cmd. (FF) | Data (A000123456) | CkH (03) | CkL (A0) |
|---|---|---|---|---|---|---|---|---|

Note: Additional Transceiver Re-Broadcasts do not change the message. The messages are simply received and re-broadcast.

---

1515

Message to Device "A0" From Device "E1" Command - "08" (Respond to PING)
Response will reverse "To" and "From" Addresses Byte Count = 17

| To Addr. (A012345678) | From Addr. (E112345678) | P # (00) | P Max (00) | P Lngth. (11) | Cmd. (08) | Data (A5) | CkH (04) | CkL (67) |
|---|---|---|---|---|---|---|---|---|

FIG. 15

SMOKE DETECTION METHODS, DEVICES, AND SYSTEMS

CROSS-REFERENCE TO RELATED APPLICATIONS

This application is a continuation of U.S. patent application Ser. No. 09/811,076, now U.S. Pat. No. 6,914,533, filed Mar. 16, 2001, and entitled "System and Method for Monitoring and Controlling Residential Devices", which claims the benefit of U.S. Provisional Application Ser. No. 60/223,932, filed Aug. 9, 2000, and entitled "Design Specifications for a Smoke Detector Communication device"; and is a continuation-in-part of: U.S. patent application Ser. No. 09/790,150, now U.S. Pat. No. 6,522,974, filed Feb. 21, 2001, and entitled "System and Method for Monitoring and Controlling Residential Devices"; U.S. patent application Ser. No. 09/271,517, now abandoned, filed Mar. 18, 1999, and entitled, "System For Monitoring Conditions in a Residential Living Community"; U.S. patent application Ser. No. 09/439,059, now U.S. Pat. No. 6,437,692, filed Nov. 12, 1999, and entitled, "System and Method for Monitoring and Controlling Remote Devices"; U.S. patent application Ser. No. 09/102,178, now U.S. Pat. No. 6,430,268, filed Jun. 22, 1998, entitled, "Multi-Function General Purpose Transceiver"; U.S. patent application Ser. No. 09/172,554, now U.S. Pat. No. 6,028,522, filed Oct. 14, 1998, entitled, "System for Monitoring the Light Level Around an ATM"; and U.S. patent application Ser. No. 09/412,895, now U.S. Pat. No. 6,218,953 filed Oct. 5, 1999, entitled, "System and Method for Monitoring the Light Level Around an ATM". Each of the above-identified U.S. patent applications is hereby incorporated herein by reference in its entirety as if fully set forth in this patent application.

TECHNICAL FIELD

The present invention generally relates to remotely monitored residential systems, and more particularly, to smoke detection methods, devices, and systems to monitor smoke conditions and communicate smoke conditions to a remote controller or monitoring device.

BACKGROUND

There are a variety of systems for monitoring and controlling manufacturing processes, inventory systems, emergency control systems, and the like. Most automated systems use remote sensors and controllers to monitor and respond to various system parameters to reach desired results. A number of control systems utilize computers or dedicated microprocessors in association with appropriate software to process system inputs, model system responses, and control actuators to implement corrections within a system.

The prior art FIG. 1 sets forth a traditional monitoring system 100. The exemplary monitoring sensor 105 is hardwired to a local controller 110, which communicates to a central monitoring station 115 via the public switched telephone network (PSTN) 125. An example of this kind of system would be a traditional home security system. Each monitoring device 105 such as a smoke detector, motion detector, or glass breakage detector hardwired to the central monitoring station 115 via the PSTN 125 and the local controller 110.

Residential monitoring systems have multiplied as individuals seek protection and safety in their residences. It has been proven that monitoring for the presence of heat or smoke indicative of fire, and sounding an audible alarm when detecting fire saves lives. Additionally, fire (heat or smoke) detectors are typically incorporated into home security systems to provide fire detection services. These home security systems, however, are often hardwired into the residence, which can be costly and quite difficult to install. Also, each residential system individually communicates with the central location via the PSTN. This connection is quite susceptible to interruption, either by accident or on purpose, and requires each residence to have a connection to the PSTN. Accordingly, it would be advantageous to develop a fire monitoring system that easily, reliably, and quickly communicates with a remote central location when necessary.

BRIEF SUMMARY OF THE INVENTION

The present invention is generally directed to a system and a cost-effective method for accessing home monitoring devices remotely via a distributed wide-area network (WAN). More specifically, the present invention is directed towards a smoke detector system for monitoring the presence of smoke conditions and communicating the smoke condition to a remote central location.

The smoke detection system comprises a smoke detection device in communication with a communication device. The smoke detection device outputs a signal or a change in a signal once smoke is detected. This signal or change in signal is monitored by the communication device. The smoke condition is then communicated to the remote central location via a message system. In accordance with one preferred embodiment of the present invention, a fire detection system includes one or more monitoring devices accessible ultimately through a computing device in communication with the WAN. The monitoring devices communicate with wireless transceivers that transmit and/or receive encoded data and control signals to and from the computing device. Additional wireless repeaters can relay the encoded data and control signals between transceivers disposed in connection with the monitoring devices and a gateway to the WAN. A portion of the information communicated can include data that uniquely identifies the monitoring devices. Another portion of the data can be a multi-bit-code word that may be decipherable through a look-up table within either a WAN gateway or a WAN interconnected computer.

In accordance with one preferred embodiment of the present invention, a smoke detection system is configured to monitor and report system parameters. The system is implemented by using a plurality of wireless transceivers. At least one wireless transceiver is interfaced with at least one of a sensor, transducer, actuator or some other device associated with an application parameter of interest. The system also includes a plurality of transceivers that act as signal repeaters that are dispersed throughout the nearby geographic region at defined locations.

WAN integrated computers may be informed of transceiver physical locations after permanent installation, as the installation location of the transceivers is not limited. Each transceiver that serves to repeat a previously generated data signal may be further integrated with its own unique sensor or a sensor actuator combination as required. Additional transceivers may be configured as stand alone devices that serve to simply receive, format, and further transmit system data signals.

Further, a detection system according to the present invention can include a local data formatter that is configured to receive information communicated from the transceivers, format the data, and forward the data via the gateway to one or more software application servers interconnected with the WAN. The application server further includes evaluating means for evaluating the received information and identifying the system parameter and the originating location of the parameter. The application server can also include updating means for updating a database or further processing the reported parameters.

In another preferred embodiment of the present invention, a smoke detector comprises a smoke sensor and a communication device. The smoke sensor preferably provides an alarm signal upon detecting smoke. The communication device preferably has a unique address to distinguish it from other communication devices, wirelessly transmits the alarm signal to a remote monitoring device, and formats the alarm signal into a packet. The smoke sensor can be, among others, a photodetection smoke sensor or an ionizing smoke detector. The smoke detector can also comprise an alarm to emit an audible alarm or a visual alarm in response to the alarm signal. The packet preferably includes a receiver address comprising a scalable address of the remote monitoring device, a sender address comprising the unique address of the communication device, a command indicator comprising a command code, at least one data value comprising a scalable message, and an error detector that is a redundancy check error detector. The packet can also include a packet length indicator indicating the number of bytes in a packet; a total packet indicator indicating the number of packets in a message; and a current packet indicator to distinguish one packet from another packet. Still yet, the packet can also include a preface having a predetermined sequence including a first logic level and a subsequent sequence including at least two bytes of a second logic level; and a postscript comprising a low voltage output. The communication device can be a radio frequency transceiver capable of receiving and transmitting radio frequency transmissions and the communication device may also transmit the alarm signal using digital modulation.

In yet another preferred embodiment of the present invention, a smoke detection system comprises a monitoring station and a plurality of smoke detectors. The smoke detectors can each have a unique identifier and can wirelessly transmit an alarm signal to the monitoring station by formatting the alarm signal into a packet. The packet can include a receiver address comprising a scalable address of the monitoring station, a sender address comprising the unique identifier of the smoke detector, a command indicator comprising a command code, at least one data value comprising a scalable message, and an error detector that is a redundancy check error detector. The plurality of smoke detectors can each include a smoke sensor and a communication device. The smoke sensor can provide the alarm signal upon detecting smoke and the communication device can format the alarm signal into the packet and transmit the packet.

A smoke detection system in accordance with the present invention can further comprise a gateway to receive the alarm signal and to provide the alarm signal to the monitoring station. The gateway preferably receives the packet, configures the packet into a data format for the monitoring station, and transmits the configured packet to the monitoring station via a wide area network. The gateway may also comprise a memory to determine which smoke detector transmitted the alarm signal based at least partially on the unique identifier for the smoke detectors.

The smoke detectors in the smoke detection system can comprise a radio frequency transceiver to wirelessly transmit the alarm signal. In addition, the smoke detectors can comprise a transceiver, so that each of the smoke detectors can wirelessly communicate with at least one other smoke detector. The smoke detectors can also transmit the alarm signal using digital modulation. The smoke detectors may also receive control signals from the monitoring station so that the monitoring station can control the operations of the smoke detectors.

In still yet another preferred embodiment of the present invention, a smoke detection system can comprise multiple smoke detectors each having a unique address, a gateway, and a monitoring station. At least one of the smoke detectors can wirelessly transmit an alarm signal over a radio frequency network to the gateway as a packet. In addition, the gateway can receive the alarm signal from the smoke detector, configure the alarm signal for transmission over a wide area network, and transmit the alarm signal over the wide area network to the monitoring station.

The alarm signal packet transmitted by the smoke detector can include a receiver address comprising a scalable address of the monitoring station, a sender address comprising the unique address of the smoke detector transmitting the alarm signal, a command indicator comprising a command code, at least one data value comprising a scalable message, and an error detector that is a redundancy check error detector. The alarm signal packet can also include a packet length indicator indicating the number of bytes in a packet, a total packet indicator indicating the number of packets in a message, and a current packet indicator to distinguish one packet from another packet.

The smoke detector can include a low-powered radio frequency transceiver so that it can transmit the alarm signal packet as low-powered radio frequency transmission. The smoke detector can also include a transmitter that can transmit the alarm signal packet using digital modulation, such as Manchester encoding, Quadrature shift keying, On-off keying, and Amplitude shift keying.

BRIEF DESCRIPTION OF THE DRAWINGS

The accompanying drawings incorporated in and forming a part of the specification, illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views.

FIG. 14 illustrates a diagram of an embodiment of a messaging system in accordance with the present invention.

FIG. 15 illustrates diagrams of sample messages in accordance with the messaging system of FIG. 14.

DETAILED DESCRIPTION OF PREFERRED EMBODIMENTS

Figure 2:
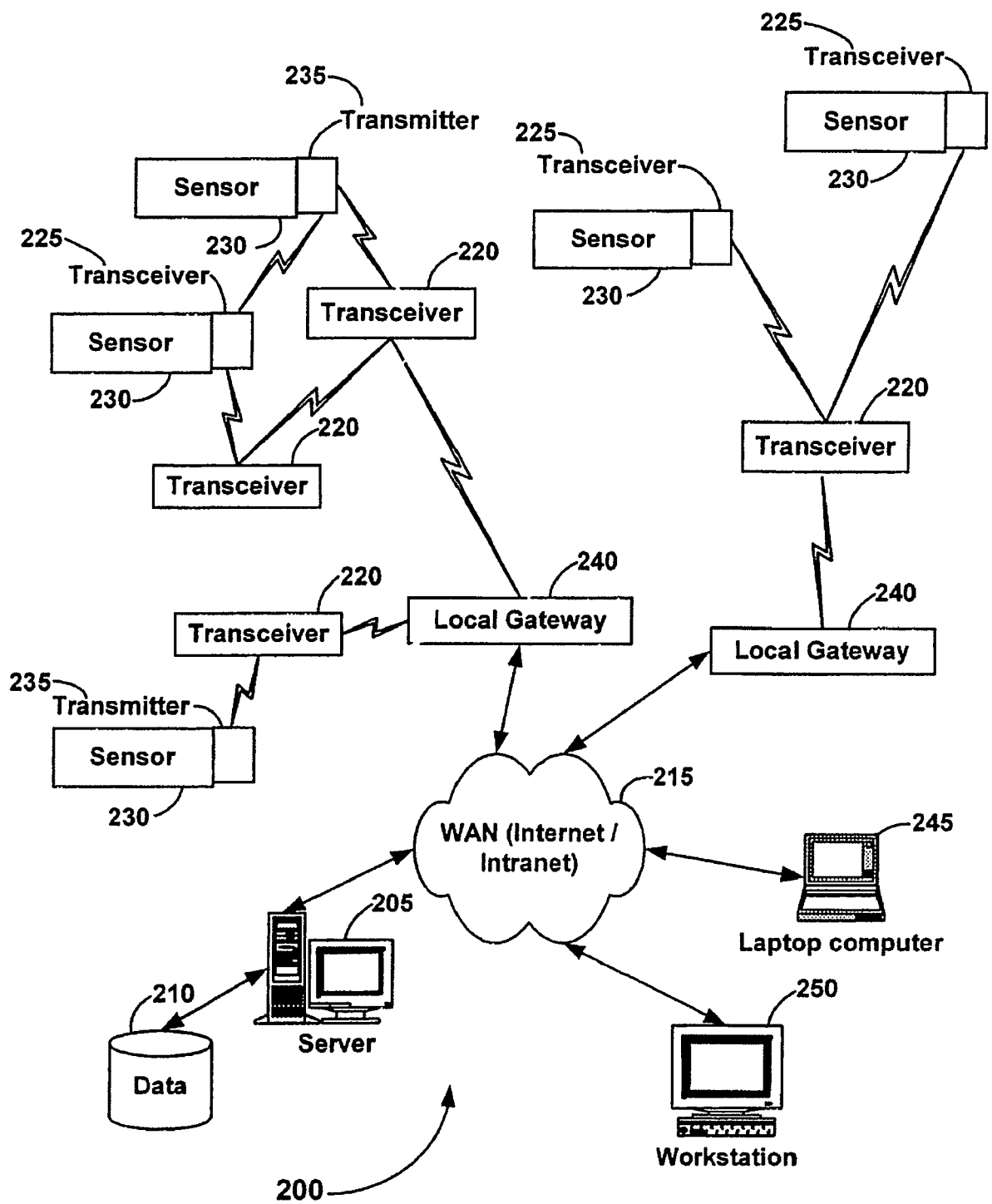
FIG. 2 illustrates a diagram of a monitoring system in accordance with an embodiment of the present invention.

Having summarized the invention above, reference is now made in detail to the description of the invention as illustrated in the drawings. FIG. 2 is a schematic diagram illustrating a distributed data monitoring/control system suitable for home monitoring applications in accordance with an embodiment of present invention. As illustrated in FIG. 2, a distributed data monitoring/control system (DDMCS) in accordance with the present invention is identified generally by reference numeral 200. The DDMCS 200 may comprise one or more application servers 205 (one shown for simplicity of illustration), one or more data base servers 210, a WAN 215, a plurality of transceiver/repeaters 220, transceivers 225, sensors 230, transmitters 235, and at least one local gateway 240.

As is further illustrated in FIG. 2, a sensors 230 can be integrated such that it is communicatively coupled with a suitably configured RF transceiver/repeater 220, an RF transceiver 225, or an RF transmitter 235. Hereinafter, a group including an RF transceiver/repeater 220, an RF transceiver 225, and an RF transmitter 235 will be collectively referred to as RF communication devices. Those skilled in the art will appreciate the application of the various devices deployed in a wireless network interface between a plurality of residential system sensors 230 and various computing devices in communication with a WAN 215 in a distributed home monitoring system.

RF communication devices are preferably small in size and may be configured to transmit a relatively low-power RF signal. As a result, in some applications, the transmission range of a given RF communication device may be relatively limited. As will be appreciated from the description that follows, this relatively limited transmission range of the RF communication devices is an advantageous and desirable characteristic of the DDMCS 200. Although the RF communication devices are depicted without a user interface such as a keypad, in certain embodiments the RF communication devices may be configured with user selectable pushbuttons, switches, or an alphanumeric keypad suitably configured with software and or firmware to accept operator input. Often, the RF communication devices will be electrically interfaced with a sensor 230, such as with a smoke detector, where user selectable inputs may not be needed.

As illustrated in FIG. 2, the one or more sensors 230 may be communicatively coupled to at least one local gateway 240 via an RF transmitter 235, an RF transceiver 225, or in the alternative, an RF transceiver/repeater 220. Those skilled in the art will appreciate that when sending a command from the server 205 to a sensor 230, the RF communication device in communication with the sensor 230 is preferably a two-way communication device. It will also be appreciated that one or more sensors may be in direct communication with one or more local gateways 240. It will be further appreciated that the communication medium between the one or more sensors 230 and the one or more local gateways 240 may be wireless or for relatively closely located configurations a wired communication medium may be used.

The DDMCS 200 may comprise a plurality of stand-alone RF transceiver/repeaters 220 as shown in FIG. 2. Each stand-alone RF transceiver/repeater 220 as well as each RF transceiver 225 may be configured to receive one or more incoming RF transmissions (transmitted by a remote transmitter 235 or transceiver 225) and to transmit an outgoing signal. This outgoing signal may be another low-power RF transmission signal, a higher-power RF transmission signal, or alternatively may be transmitted over a conductive wire, fiber optic cable, or other transmission media. The internal architecture of the various RF communication devices will be discussed in more detail below in connection with FIG. 3 and FIG. 4. It will be appreciated by those skilled in the art that integrated RF transceivers 225 can be replaced by RF transmitters 225 for client specific applications that require data collection only.

One or more local gateways 240 are preferably configured and disposed to receive remote data transmissions from the various stand-alone RF transceiver/repeaters 220, integrated RF transmitters 235, or the integrated RF transceivers 225. The local gateways 240 may be configured to analyze the transmissions received, convert the transmissions into TCP/IP format, and further communicate the remote data signal transmissions via WAN 215 to one or more application servers 205, or other WAN 215 interconnected computing devices such as a laptop 245 or a workstation 250. As will be further described below, local gateways 240 may communicate information in the form of data and control signals to the sensor 230 from application server 205, laptop computer 245, and workstation 250 across WAN 215. The application server 205 can be further associated with a database server 210 to record client specific data or to assist the application server 205 in deciphering a particular data transmission from a particular sensor 230.

An integrated RF communication device (e.g., an RF transmitter 235, an RF transceiver 225, or an RF transceiver/repeater 220) is preferably located sufficiently close to local gateways 240 such that its RF output signal can be received by one or more local gateways 240. Thus, the data transmission signal need not be processed and repeated through either an RF transceiver/repeater 220 or an RF transceiver 225. To transmit the RF signal, the RF communication device can use an RF bit speed of 4.8 Kbps at half duplex with a bit speed of 2.4 Kbps and can use Manchester encoding. While these are examples of an RF transmission protocol, other bit speeds and encoding methodologies may also be utilized. For example, quadarture shift keying can be utilized to allow the use of a hexadecimal message in contrast with a binary message.

A DDMCS 200 may be used in conjunction with a variety of residential systems to permit remote data access via a plurality of distributed computing devices in communication with a suitable WAN 215. As will be further appreciated from the discussion herein, each of the RF communication devices may have substantially identical construction (particularly with regard to their internal electronics). Such construction provides a cost-effective implementation at the system level. Furthermore, a plurality of stand-alone RF transceiver/repeaters 220, which may be identical to one another, may be disposed to provide adequate coverage throughout a residence and/or a residential community. Preferably, stand-alone RF transceiver/repeaters 220 may be located such that only one stand-alone RF transceiver/repeater 220 will pick up a data transmission from a given integrated RF transceiver 225 and/or RF transmitter 235. In certain instances, however, two or more stand-alone RF transceiver/repeaters 220 may pick up a single data transmission. Thus, the local gateways 240 may receive multiple versions of the same data transmission signal from an integrated RF transceiver 225, but from different stand-alone RF transceiver/repeaters 220. As further explained below, duplicative transmissions (e.g., data transmissions received at more than one local gateway 240 originating from a single RF communication device) may be appropriately handled.

The local gateways 240 may communicate with all RF communication devices. Since the local gateways 240 are permanently integrated with the WAN 215, the application server 205 of FIG. 2 can host application-specific software, which in prior art schemes was typically hosted in a local controller 110 of FIG. 1. The data monitoring and control devices of embodiments of the present invention need not be disposed in a permanent location as long as they remain within signal range of a system-compatible-RF-communication device that is within signal range of a local gateway 240 interconnected through one or more networks to the application server 205. The DDMCS 200 as illustrated in FIG. 2, provides a flexible access and control solution through virtually any suitably configured computing device in communication with the WAN 215. For example, a laptop computer 245 and/or a computer workstation 250 appropriately configured with suitable software may provide remote operator access to data collected via the DDMCS 200. In more robust embodiments, the laptop computer 245 and the computer workstation 250 may permit user entry of remote operative commands.

In a preferred embodiment of the DDCMS 200, an application server 205 collects, formats, and stores client specific data from each of the integrated RF transmitters 235, RF transceivers 225, and/or RF transceiver/repeaters 220 for later retrieval or access from workstation 250 or laptop 245. Workstation 250 or laptop 245 can be used to access the stored information via a Web browser. In another embodiment, clients may elect for proprietary reasons to host control applications on their own WAN 215 connected workstation 250. Database 210 and application server 205 may act solely as data collection and reporting devices with the client workstation 250.

The information transmitted and received by the RF communication devices of the present invention may be further integrated with other data transmission protocols for transmission across telecommunications and computer networks other than the WAN 215. In addition, telecommunications and computer networks other than the WAN 215 can function as a transmission path between the communicatively coupled RF communication devices, the local gateways 240, and the application server 205.

Figure 3:
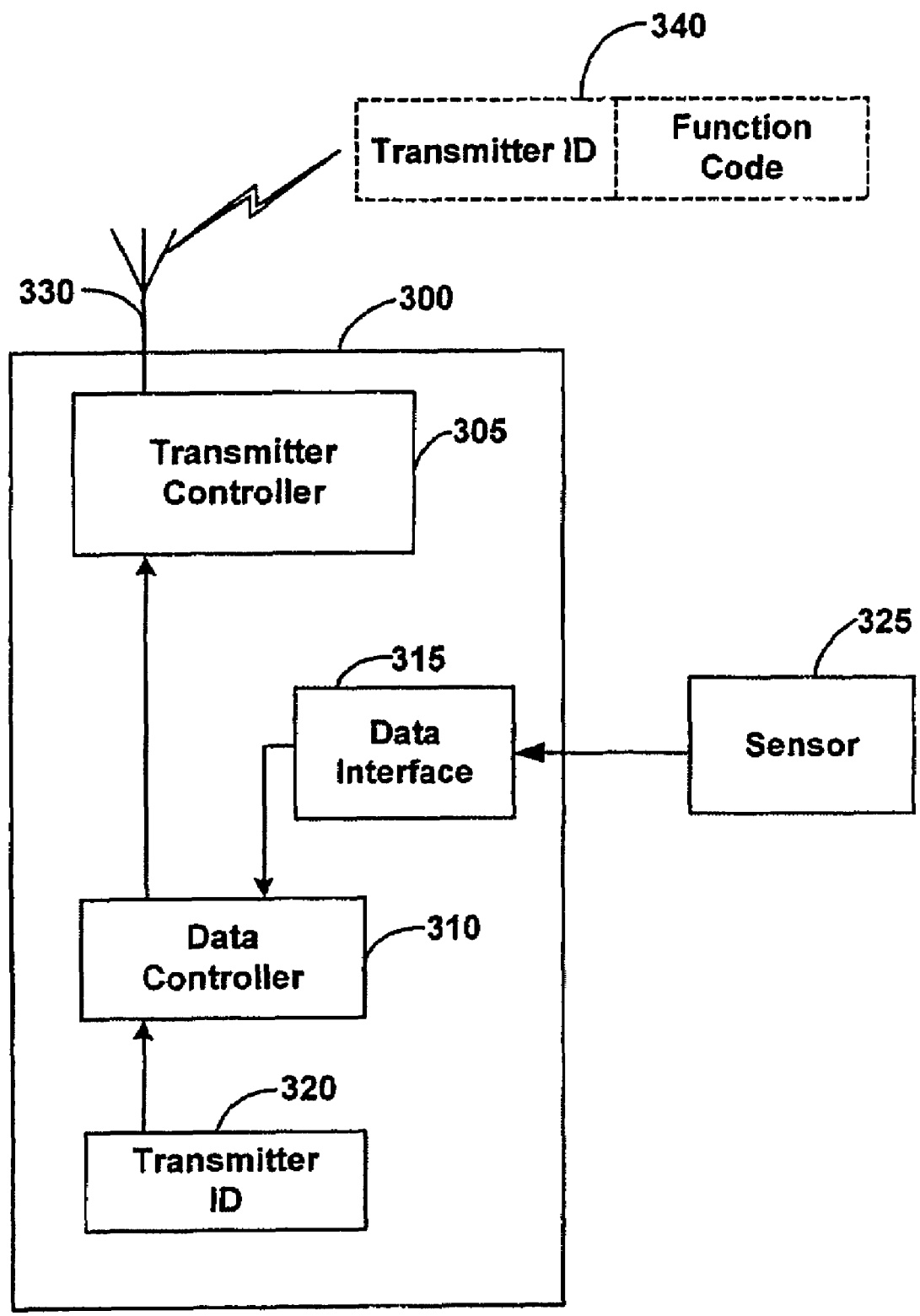
FIG. 3 illustrates a diagram of an embodiment of a communication device in accordance with an embodiment of the present invention.

FIG. 3 sets forth an embodiment of a communication device 300 of the present invention. The communication device 300 comprises a transmitter controller 305, a data controller 310, a data interface 315, a transmitter identifier (ID) 320, and a sensor 325. The sensor can receive data signals for the communication device 300. While the communication device 300 is shown as an RF transmitter, it could also be an infrared, ultrasound, or other transmitter. As shown, the data interface 315 receives one or more signals ("data") from the sensor 325, and processes the data accordingly. This processing can include signal conditioning, analog-to-digital conversion, or other processing depending upon individual design constraints. The data interface 315 outputs the conditioned data to the data controller 310. The transmitter ID 320 can be a unique identifier of the communication device 300, and can be an EPROM or other appropriate memory device. The data controller 310 uses the conditioned data and the transmitter identifier 320 to create a message 340 according to a messaging protocol system. The data controller 310 then outputs the message 340 to the transmitter controller 305, which transmits the message 340, preferably via the antenna 330. The antenna 330 can be an externally mounted, vertically polarized antenna that can be mounted on a printed circuit board (not shown) or other appropriate embodiment as would be known to one of ordinary skill in the art. Other antennas may also be used in accordance with the embodiments of the present invention.

Each transmitter unit 300 in a DCCMS 200 (FIG. 2) may be configured with a unique identification code (e.g., a transmitter identification number) 320, that uniquely identifies the RF transmitter 320 to other devices within the DCCMS 200 (FIG. 2). The transmitter identifier 320 may be programmable, and implemented in the form of, for example, an EPROM. Alternatively, the transmitter identifier 320 may be set/configured through a series of dual inline package (DIP) switches. Additional implementations of the transmitter identifier 320, whereby the number may be set/configured as desired, may be implemented consistent with the embodiments of the present invention.

The transmit controller 305 may convert information from digital electronic form into a format, frequency, and voltage level suitable for transmission from antenna 330. As previously mentioned, the transmitter identifier 320 is preferably set for a given transmitter 300. When received by the application server 205 (FIG. 2), the transmitter identifier 320 may be used to access a look-up table that identifies, for example, the residence, the system, and the particular parameter assigned to a particular transmitter. Additional information about the related system may also be provided within the lookup table, with particular functional codes associated with a corresponding condition or parameter, such as but not limited to, an appliance operating cycle, a power on/off status, a temperature, a position, and/or any other information that may be deemed appropriate or useful under the circumstances or implementation of the particular system.

Figure 4:
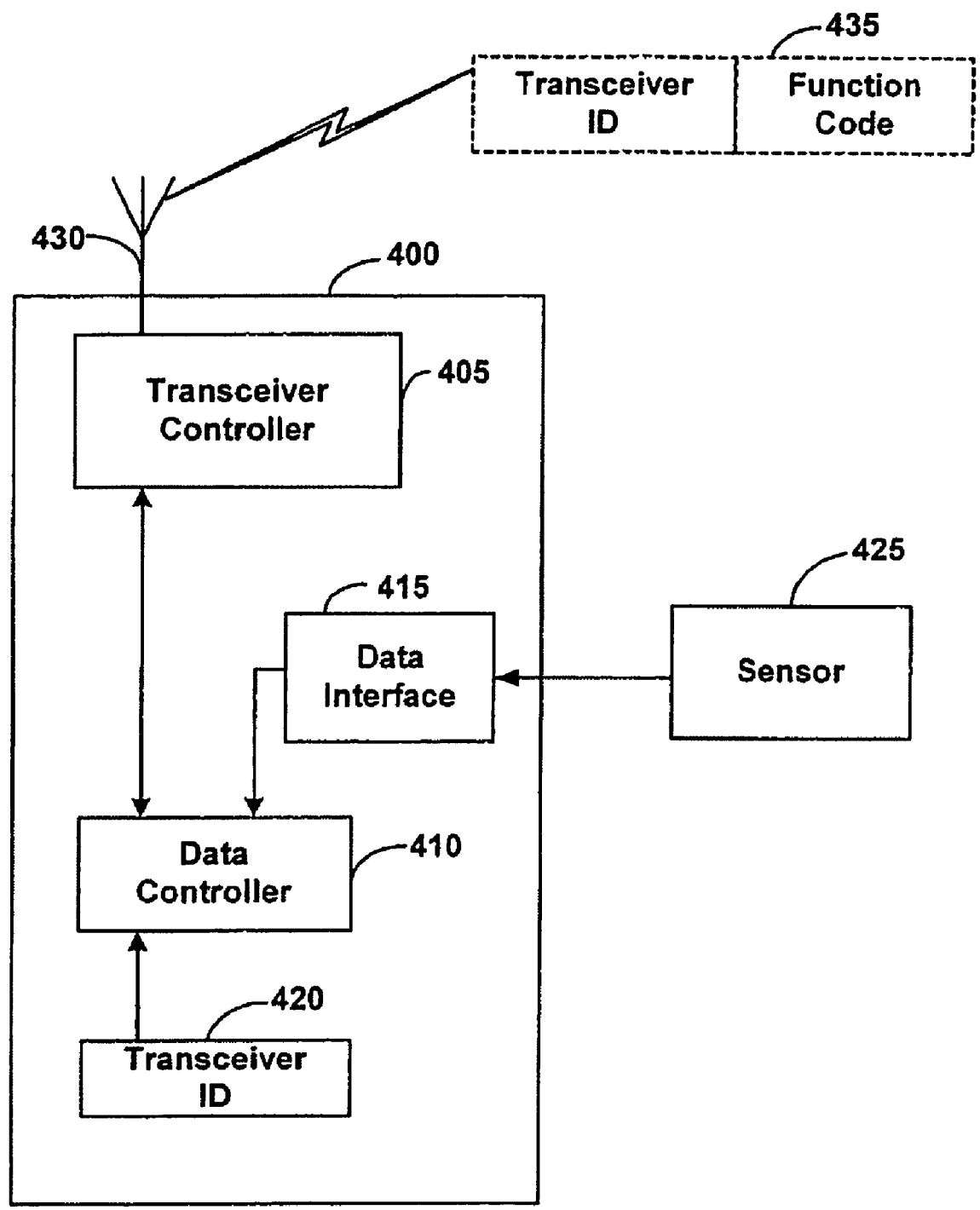
FIG. 4 illustrates a diagram of an alternate embodiment of a communication device in accordance with an embodiment of the present invention.

FIG. 4 illustrates an alternate embodiment of the communication device 400 wherein the transmitter has been replaced with a transceiver. This allows the communication device 400 to function as a repeater and receive commands from the local controller.

The communication device 400 comprises a transceiver controller 405, a data controller 410, a data interface 415, a transceiver identifier 420, and a sensor 425. While the communication device 400 is shown as an RF transceiver, it can also be an infrared, ultrasound, or other transceiver. The data interface 415 receives the sensed signal from the sensor 425 and processes it as discussed above. The data controller 410 receives the processed data, and composes a message 435 according to a preformatted message system. The transceiver controller 405 receives the message 435 and transmits the message 435 via the antenna 430.

The transceiver controller 405 may convert information from digital electronic form into a format, frequency, and voltage level suitable for transmission from the antenna 430. As previously mentioned with respect to the RF transmitter of FIG. 3, the transceiver identification 420 is preferably set for a given communication device 400. When received by the application server 205 (FIG. 2), the transceiver identifier 420 may be used to access a look-up table that identifies, for example, the residence, the system, and the particular parameter assigned to that particular transceiver. Additional information about the related system may also be provided within the lookup table, with particular functional codes associated with a corresponding condition or parameter such as, but not limited to, smoke conditions, a power on/off status, and/or any other information that may be deemed appropriate or useful under the circumstances or implementation of the particular system. The communication device 400 may be configured to receive a forward command information either using a unique RF frequency or a time interleaved packet based communication technique.

Again, each of these various input signals are routed from the sensor 425 to the data interface 415, which provides the information to a data controller 410. The data controller 410 may utilize a look-up table to access unique function codes that are communicated in data packet 435, along with a transceiver identifier 420, to a local gateway 110 and further onto a WAN 215 (FIG. 2). The data packet 435 can include a concatenation of the individual function codes selected for each of the aforementioned input parameters, as well as, a similar message (not shown) that may be received from other closely located RF transmitters 235 and RF transceivers 225 (FIG. 2).

The various RF communication devices illustrated and described in relation to the functional block diagrams of FIG. 3 and FIG. 4 may be configured with a number of optional power supply configurations. For example, a personal mobile transceiver may be powered by a replaceable battery. Similarly, a stand-alone RF transceiver/repeater 220 (FIG. 2) may be powered by a replaceable battery that may be supplemented and/or periodically charged via a solar panel. These power supply circuits, therefore, may differ from RF communication device to RF communication device depending upon the remote system monitored, the related actuators to be controlled, the environment, and the quality of service level required. Those skilled in the art will appreciate and understand how to meet the power requirements of the various RF communication devices associated with the DCCMS 200 of the present invention. As a result, it is not necessary to further describe a power supply suitable for each RF communication device and each application in order to appreciate the concepts and teachings of the present invention.

The present invention can comprise a communication device as described above, and a sensing device. The sensing device senses a condition, and outputs a sensed signal. The sensed signal can be many formats such as analog or digital given that the data interface is also configured to accommodate.

Figure 5A:
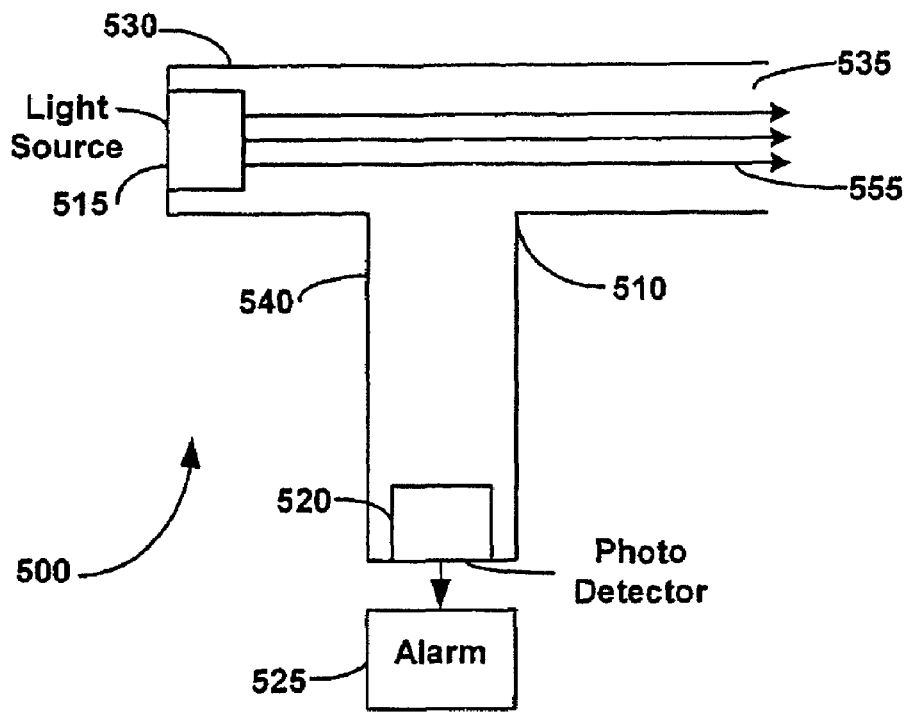
FIGS. 5A and 5B illustrate diagrams of a smoke detection device in accordance with an embodiment of the present invention.
Figure 5B:
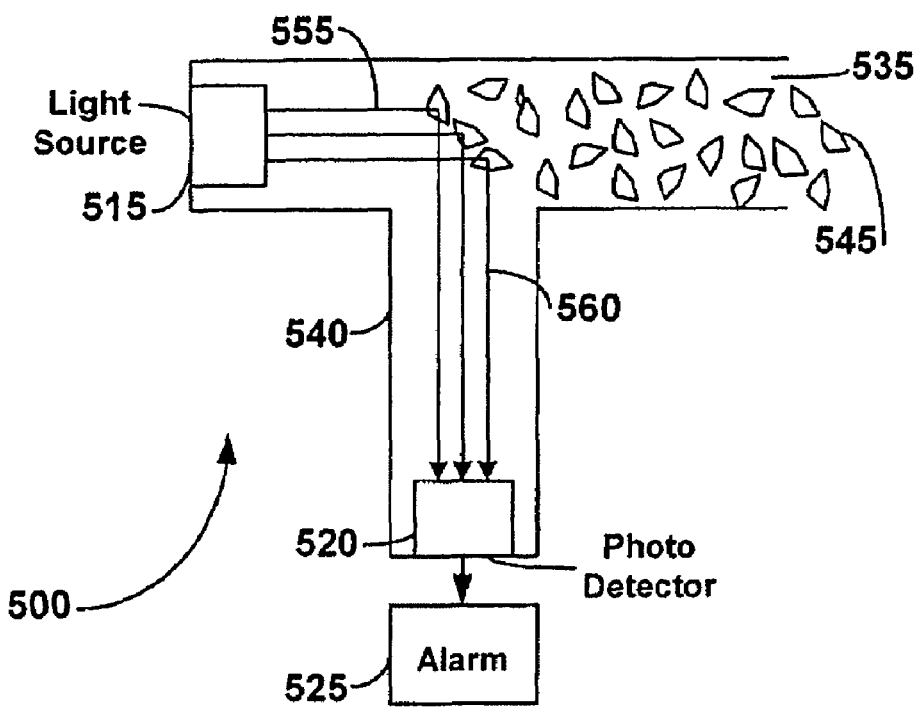
Figure 6:
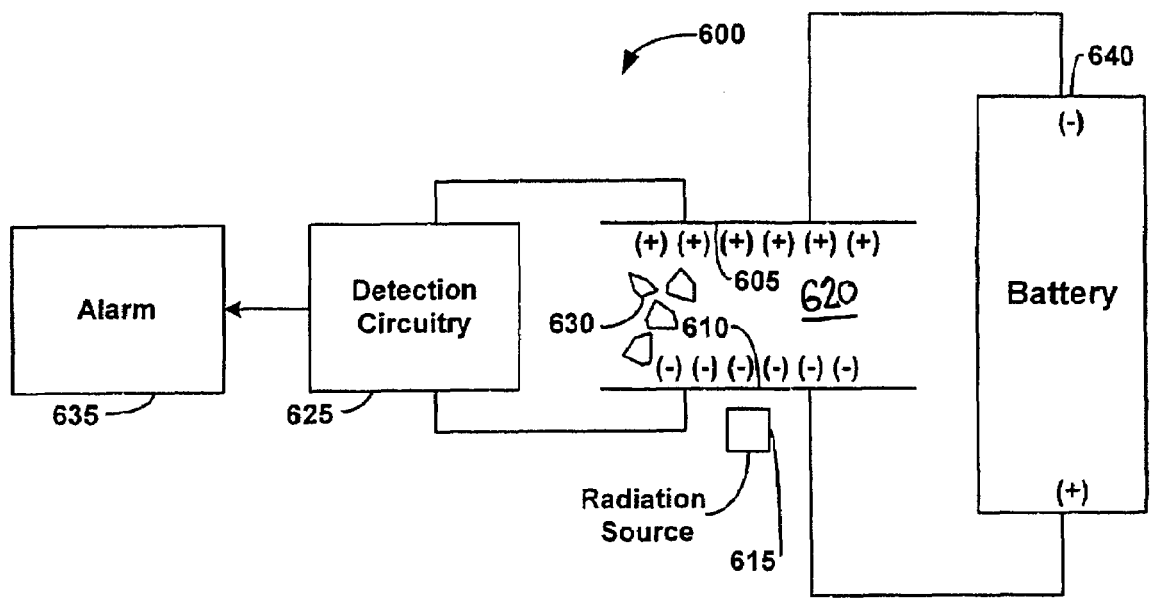
FIG. 6 illustrates a diagram of an alternate smoke detection device in accordance with an embodiment of the present invention.

FIGS. 5A, 5B, and FIG. 6 illustrate different embodiments of an exemplary sensor for use with the present sensing system. FIG. 5A illustrates a photo detection smoke detector 500, which uses light to detect a smoke condition. The photo detection smoke detector 500 comprises a T-light tube 510, a light source 515, photo detection circuitry 520, and an alarm 525. The T-light tube 510 has the light source 515 at one end of the tube 530 and an opening 535 at the other end of the tube 530. Perpendicular to and attached to the tube 530 is a leg tube 540. At the end of the leg tube 540 is the photo detector circuitry 520. The photo detector circuitry 520 communicates with the alarm 525 upon detection of smoke. As shown in FIG. 5B, to detect smoke, the light source 515 emits a light beam 555 constantly or near constantly. If smoke is present, the smoke particles 545 enter the end 535 of the tube 530. The smoke particles 545 interact with the light beam 555, causing at least a portion of the light beam 555 to refract. This refracted light 560 can then travel down the leg tube 540 and fall upon the photo detector circuitry 520. The photo detector circuitry 520 outputs an alarm signal to the alarm 525, and then the alarm 525 emits an alarm, for example an audible or visual alarm. The smoke detector 500 can either be powered by a battery (not shown) or AC wiring (not shown).

FIG. 6 illustrates a block diagram of an alternate embodiment of a smoke detector 600. This ionizing smoke detector 600 comprises two plates 605, 610 which are oppositely charged and a small radiation source 615. The battery 640, the oppositely charged plates 605, 610, and the radiation source 615 form an ionized field 620 between the plates 605, 610, which is monitored by the detection circuitry 625. The area between the plates 605, 610 can be exposed to the ambient environment. Under smoke conditions, the smoke particles 630 will enter between the plates 605, 610, disrupting the ionization field 620. The detection circuitry 625 then detects a change in the ionized field 620 and signals the alarm 635 to activate. While the smoke detector 600 shows a battery 640 as a power source, the battery 640 can be replaced with other appropriate powering systems, for example AC wiring (not shown).

Figure 7:
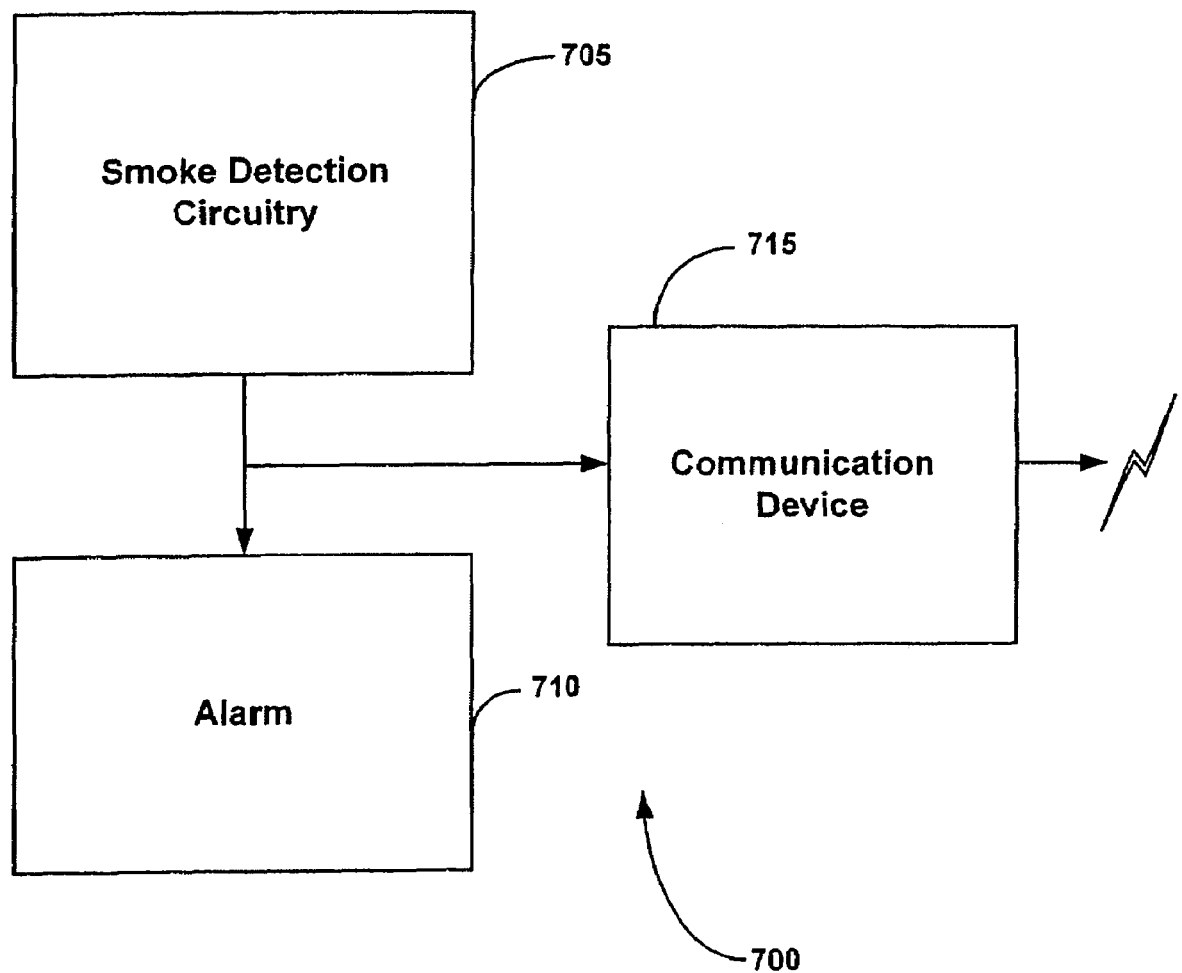
FIG. 7 illustrates a block diagram of a smoke detection system in accordance with an embodiment of the present invention.

FIG. 7 sets forth a block diagram of an embodiment of a sensing system 700 according to a preferred embodiment of the present invention. The sensing system 700 can comprise a smoke detector 705, an alarm 710, and a communication device 715. The smoke detector 705 can be many types of smoke detectors including those discussed above. The alarm can be an audible alarm or visual alarm based upon individual needs. The communication device 715 can be either the transmitter device 300 of FIG. 3 or the transceiver device 400 of FIG. 4.

In operation, the smoke detector 705 monitors for the presence of smoke. The method of smoke detection depends upon the type of smoke detector used as discussed above. Upon the detection of smoke, the smoke detector 705 outputs a control signal to the alarm 710. The alarm 710 then activates. The method of activation depends upon the type of alarm.

In addition, the communication device 715 monitors for the alarm control signal. Once the smoke detector 705 sends the alarm control signal, the communication device 715 also receives the control signal. The communication device 715 then process the control signal and transmits a message regarding the control signal to the local gateway 240 (FIG. 2) via the message protocol system discussed above.

Figure 8:
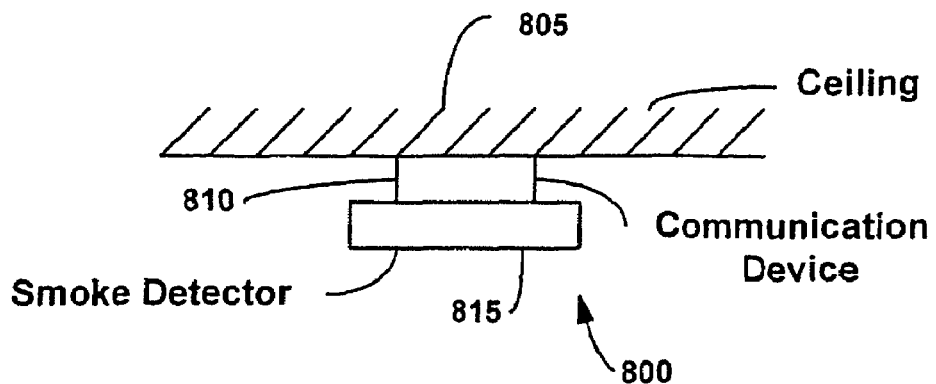
FIG. 8 illustrates a perspective view of a smoke detection system in accordance with an of the present invention.

A sensing system 800, illustrated in FIG. 8, can be mounted to a ceiling 805. As shown, the communication device 810 can be disposed between the smoke detector 815 and the ceiling 805. Traditionally, the smoke detector 815 would be mounted to the ceiling via screws or a mounting plate and screws. The sensing system 800 can be installed similarly. Likewise, the sensing system 800 can be installed in alternate orientations such as on a wall. If mounted on a wall, the sensing system 800 can again be mounted to the wall via screws or a mounting plate. Alternatively, the sensing system 800 could be mounted via the plug extensions used to connect the sensing system 800 to an electrical outlet (not shown).

Preferably, the smoke detector 815 and the communication device 810 are integrated into a single package for ease of installation. But the smoke detector 815 and communication device 810 may be separate but interconnected elements for ease of replacement in the case of device failure. In addition, the communication device 810 and smoke detector 815 can be separate devices remotely located from another one but in electrical communication.

The communication device 810 can be powered by the same power supply (not shown) that powers the smoke detector 815 or by an alternate power supply (not shown). The smoke detector 815 can be powered by, for example, a battery, AC wiring, or rechargeable batteries depending upon individual situations. If the communication device 810 is acting as both a sensing system and a repeater, as discussed above, the communication device 810 could have a dedicated power supply (not shown). The dedicated power supply (not shown) can be a battery, a rechargeable battery, or AC power with battery backup.

Figure 9:
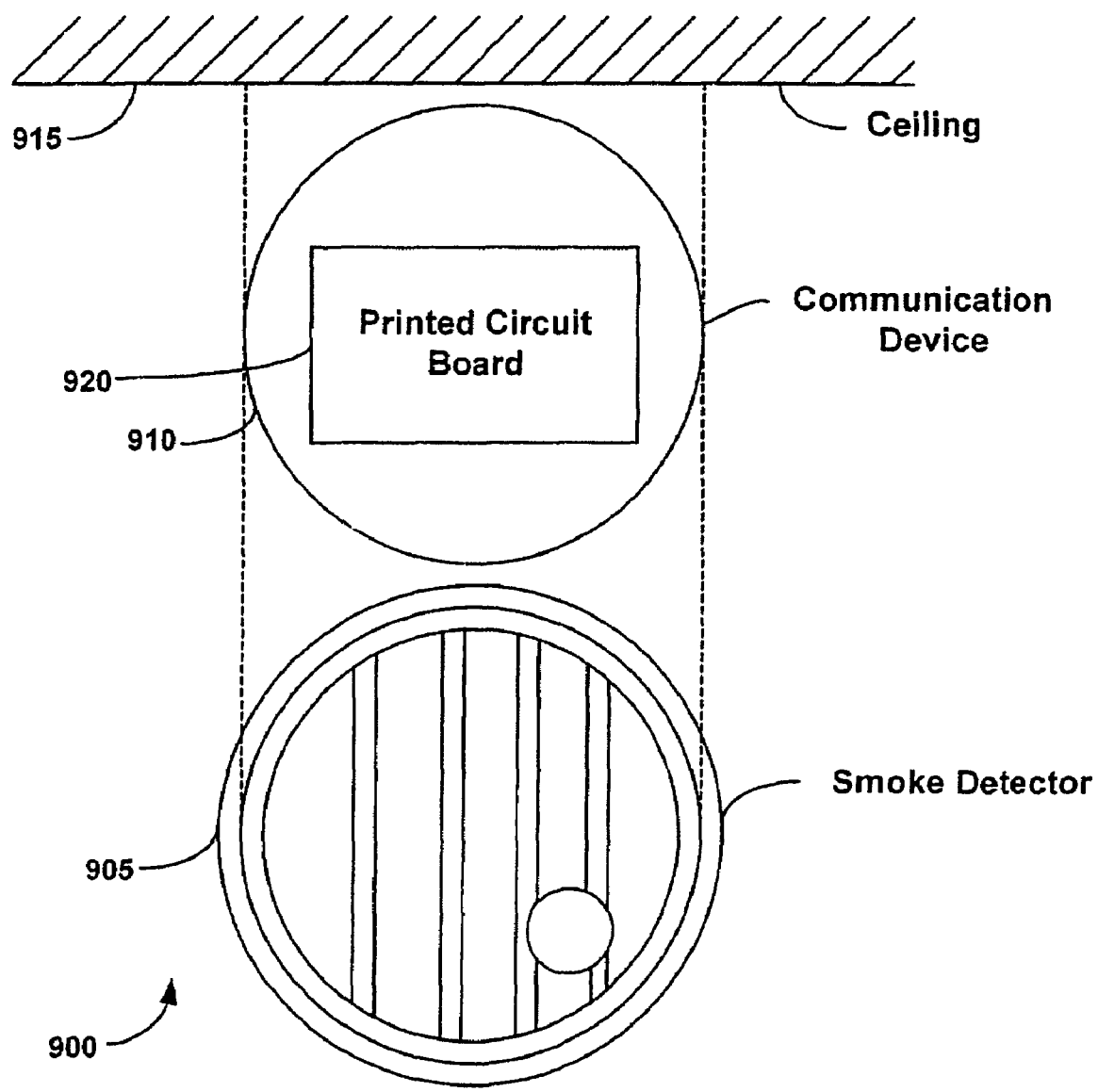
FIG. 9 illustrates a cross sectional view of a smoke detection system in accordance with an embodiment of the present invention.

FIG. 9 illustrates an exploded view of a sensing system 900. The sensing system 900 comprises a smoke detector 905 and a communication device 910 attached to a ceiling 915. As shown, the communication device 910 is attached directly to the ceiling 915, and the smoke detector 905 is attached to the ceiling 915. Alternatively, the smoke detector 905 could be attached to the ceiling separate from the communication device 910. In addition, the smoke detector 905 could be attached to the ceiling 915, and the communication device 910 between the ceiling and the smoke detection 905. Alternatively, as discussed above, the sensing system 900 can be attached to a wall many other surfaces, such as a wall. The circuitry of the communication device 910 is shown as a printed circuit board 920. The communication device 910 can be embodied in other forms, such as hybrid microelectronics or hardwired, for example.

Figure 10A:
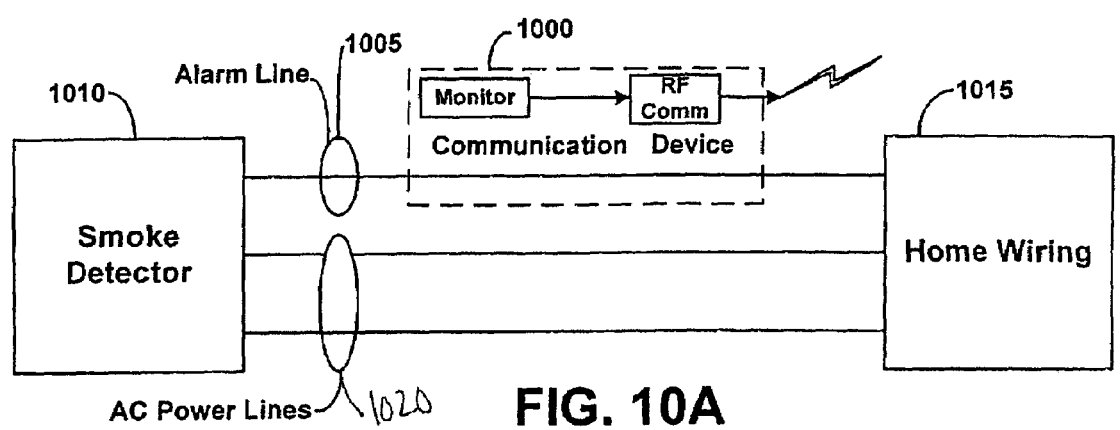
FIGS. 10A and 10B illustrate a block diagram of an alternate embodiment of the smoke detection system in accordance with the present invention.
Figure 10B:
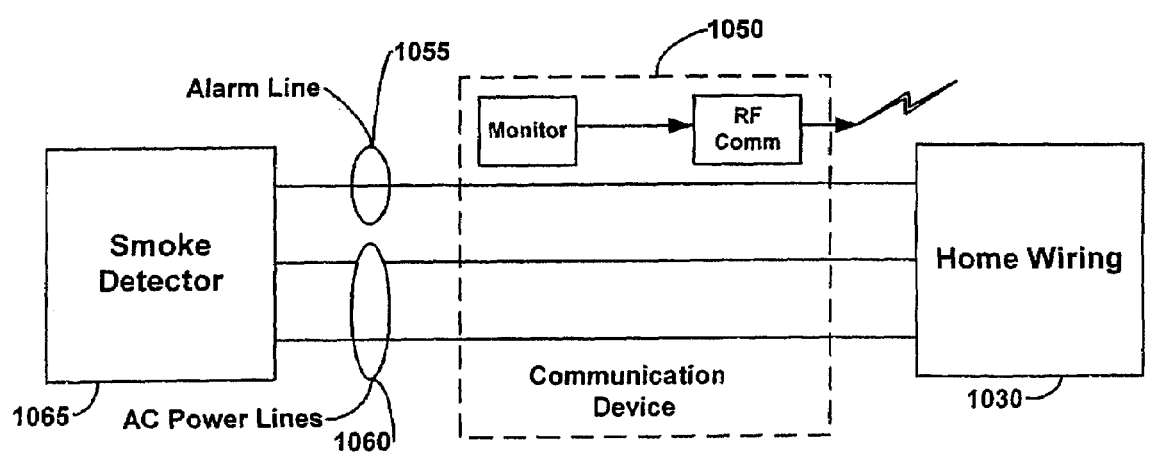

FIGS. 10A and 10B illustrate a block diagram of alternate embodiments of the sensing system 900. In these embodiments, a smoke detector is wired into a residence's AC wiring and is wired to communicate with any other smoke detector in the system 900. While these figures set forth the sensing system 900 as being powered by AC wiring, other power supplies such as batteries, rechargeable batteries, or combinations thereof, can also be utilized.

In FIG. 10A, the communication device 1000 is connected to the alarm line 1005. When the smoke detector 1010 notifies any other detectors (not shown) via the home wiring 1015 of the alarm condition, the communication device 1000 also receives the alarm signal and sends the appropriate message to a local gateway, as discussed above. It should be noted that the AC power lines 1020 do not pass through the communication device 1000.

FIG. 10B sets forth an alternate embodiment of an AC wired smoke detection system. Again, when the smoke detector 1065 notifies the other detectors (not shown) via the home wiring 1030 of the alarm condition, the communication device 1050 also receives the alarm signal and sends the appropriate message to a local gateway, as discussed above. In this case, the communication device 1050 acts as a pass-through for both the alarm line 1055, and the AC power lines 1060 that are connected to the smoke detector 1065 and the home wiring 1070.

Figure 11:
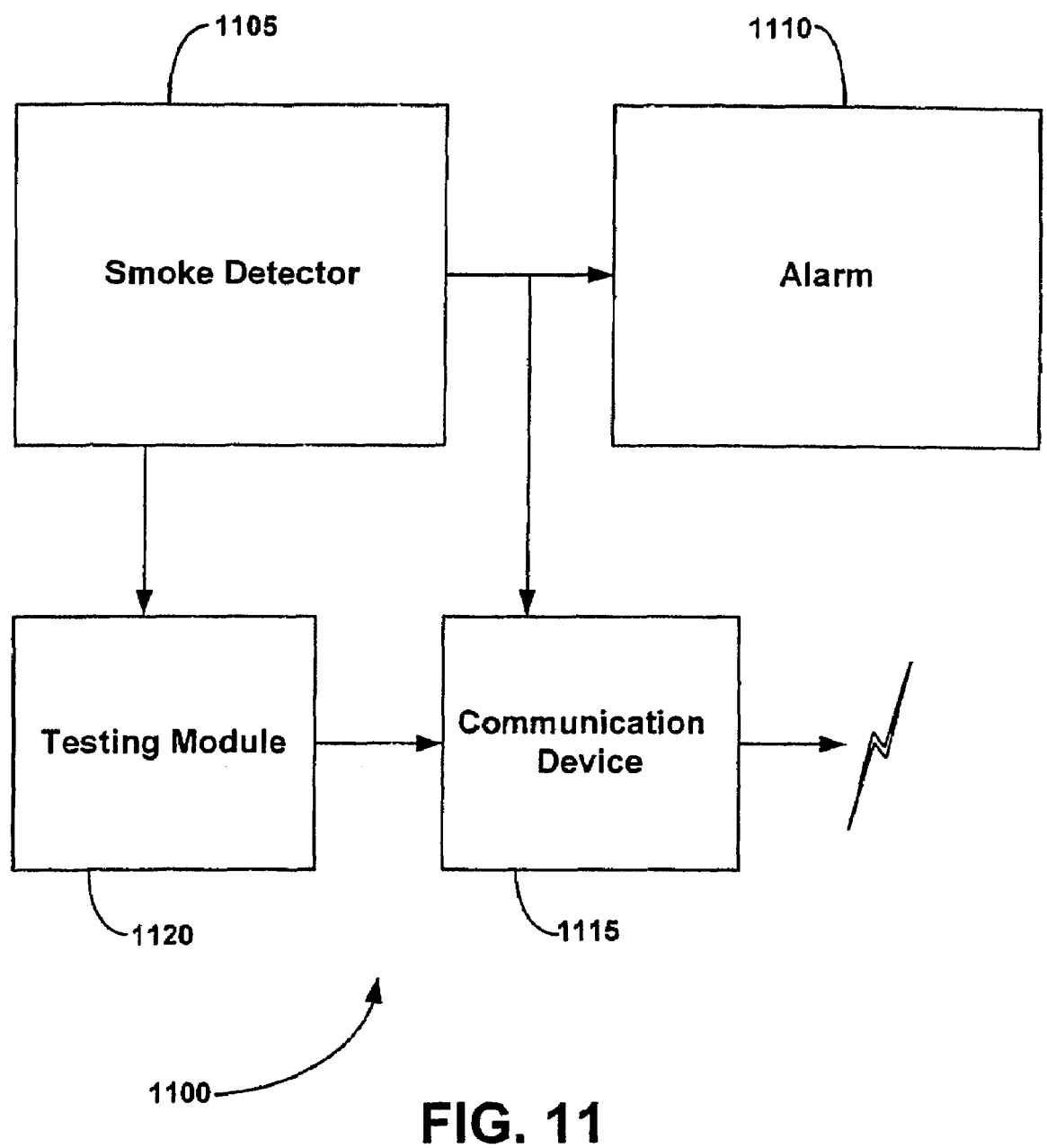
FIG. 11 illustrates a block diagram of an alternate embodiment of the smoke detection system in accordance with the present invention.

FIG. 11 illustrates a block diagram of another embodiment of a sensing system 1100. In this embodiment, the sensing system 1100 comprises a smoke detector 1105, an alarm 1110, a communication device 1115, and a testing module 1120. The sensing system 1100 monitors for a smoke condition, and sends a control signal to the alarm 1110, as discussed above. In addition, the testing module 1120 allows the on-site testing of the smoke detector 1105 and audible alarm 1110. The testing module 1120 can also temporarily disable the communication device 1115 to prevent the transmission of a false alarm during testing. Alternatively, the test module 1120 can send a control signal to the communication device 1115 in the form of a false smoke detection alarm to transmit a test message to the local gateway 240 (FIG. 2).

Figure 12:
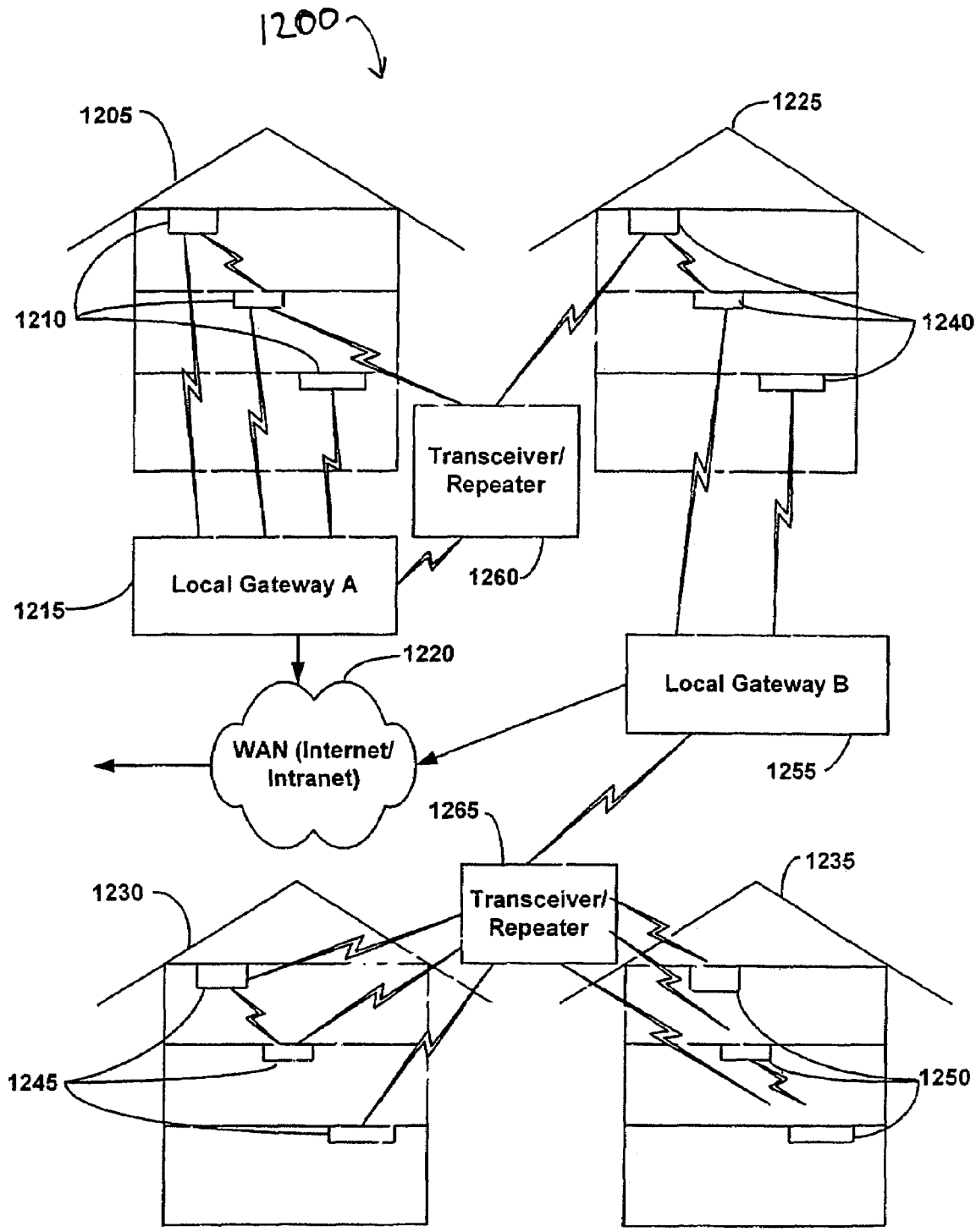
FIG. 12 illustrates a diagram of an embodiment of a residential monitoring system in accordance with the present invention.

FIG. 12 illustrates an embodiment of a residential monitoring system 1200. The residential monitoring system 1200 can comprise a single facility 1205 having multiple sensing systems 1210 communicating with a local gateway 1215 to a central location (not shown) via a WAN 1220 or other alternative method. Each of the multiple sensing systems 1200 can communicate with a local gateway through wireless or alternative communication mediums. Also, the multiple sensing systems 1200 can communicate via a message protocol system, as discussed above.

Alternatively, the residential monitoring system 1200 can comprise multiple facilities with multiple sensing systems 1210, 1240, 1245, 1250 communicating with a local gateway 1215 or a local gateway 1255 via direct wireless communication or via repeater transceivers 1260, 1265. The number of devices or facilities is limited only by individual design constraints. Further, information regarding various aspects of the operation of this system can be found in the commonly assigned U.S. Pat. No. 6,522,974 entitled "System and Method for Monitoring and Controlling Residential Devices". The number of sensing systems that can be used with a single gateway or with a single WAN is limited only by the design of the local gateway and/or WAN.

Figure 13:
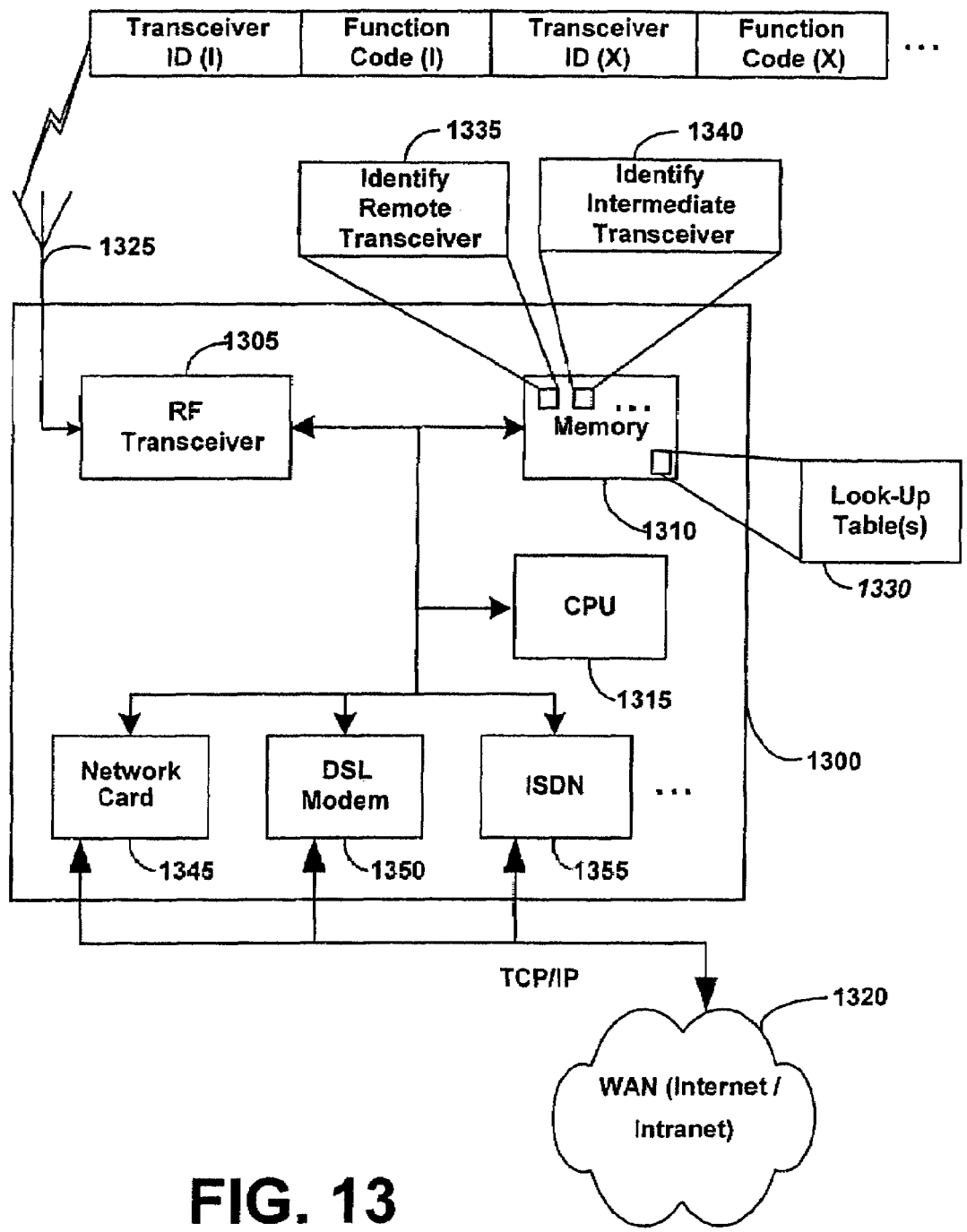
FIG. 13 illustrates a diagram of an embodiment of a local controller in accordance with the present invention.

FIG. 13 illustrates a block diagram of an embodiment of the local gateway 1300. The local gateway 1300 comprises an RF transceiver 1305, a memory 1310, a CPU 1315, and some system for communicating with the WAN 1320.

The RF transceiver 1305 may be configured to receive incoming RF signal transmissions via the antenna 1325. Each of the incoming RF signal transmissions may be consistently formatted in the convention previously described. The local gateway 1300 may be configured such that the memory 1310 includes a look-up table 1330 that may assist in identifying the various remote and intermediate RF communication devices used in generating and transmitting the received data transmission, as illustrated in memory sectors 1335 and 1340. Programmed or recognized codes within the memory 1310 may also be provided and configured for controlling the operation of a CPU 1315 to carry out the various functions that are orchestrated and/or controlled by the local gateway 1300. For example, the memory 1310 may include program code for controlling the operation of the CPU 1315 to evaluate an incoming data packet to determine what action needs to be taken. One or more look-up tables 1330 may also be stored within the memory 1310 to assist in this process. Furthermore, the memory 1310 may be configured with program code configured to identify a remote RF transceiver 1305 or identify an intermediate RF transceiver 1305. Function codes, RF transmitter and/or RF transceiver ID may all be stored with associated information within the look-up tables 1310. Thus, one look-up table 1310 may be provided to associate transceiver identifier information with received remote transceiver and intermediate transceiver information.

Another look-up table 1330 may be used to associate function codes with the interpretation thereof. For example, a unique code may be associated by a look-up table 1330 to identify functions such as test, temperature, smoke alarm active or security system breach. In connection with the lookup table(s) 1330, the memory 1310 may also include a plurality of code segments that are executed by the CPU 1315, which may in large part control operation of the gateway 1300. For example, a first data packet segment may be provided to access a first lookup table to determine the identity of an RF transceiver, which transmitted the received message. A second code segment may be provided to access a second lookup table to determine the proximate location of the message generating RF transceiver, by identifying the RF transceiver that relayed the message. A third code segment may be provided to identify the content of the message transmitted. Namely, is it a fire alarm, a security alarm, an emergency request by a person or a temperature control setting. Consistent with the various embodiments of the invention, additional, fewer, or different code segments may be provided to perform different functional operations and data signal transfers throughout the DCCMS 200 (FIG. 2) of the present invention.

Figure 1:
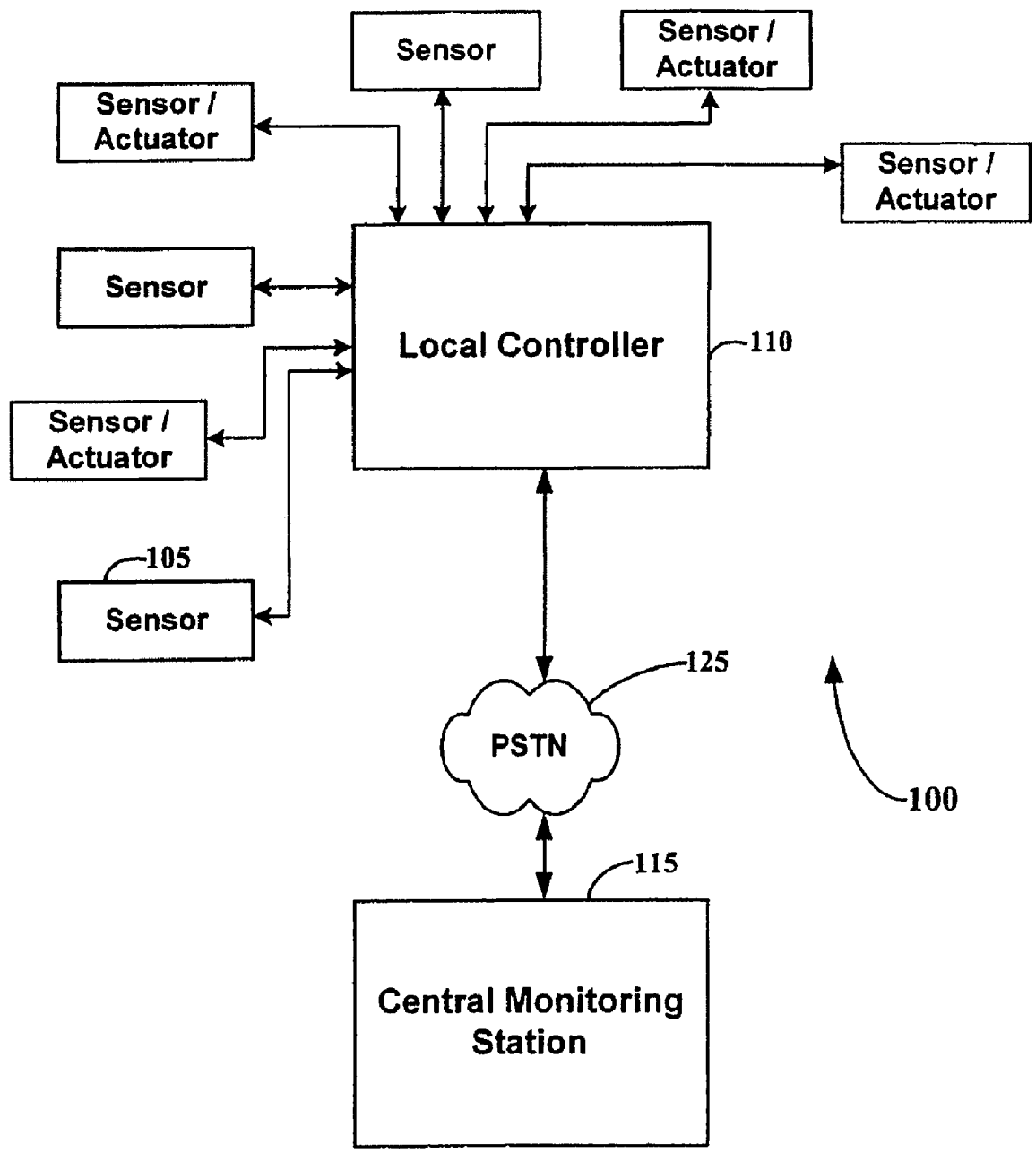
FIG. 1 illustrates a prior art monitoring system.

The local gateway 1300 may also include one or more mechanisms to facilitate network-based communication with remote computing devices. For example, the gateway 1300 may include a network card 1345, which may allow the gateway 1300 to communicate across a local area network to a network server, which in turn may contain a backup gateway (not shown) to the WAN 215 (FIG. 2). Alternatively, the local gateway 1300 may contain a modem 1350, which may be configured to provide a link to a remote computing system, by way of the PSTN 125 (FIG. 1). In yet another alternative, the local gateway 1300 may include an ISDN card 1355 configured to communicate via an ISDN connection with a remote system. Other communication interfaces may be provided to serve as primary and or backup links to the WAN 215 (FIG. 2), or to local area networks that might serve to permit local monitoring of gateway 1300 health and data packet control.

Having described the physical layer of a DCCMS 200 (FIG. 2) consistent with the present invention, reference is now made to FIG. 14, which describes a data structure of messages that may be sent and received via the DCCMS 200. A standard message may comprise a "to" address; a "from" address; a packet number; a maximum packet number; a packet length; a command portion; a data portion; a packet check sum (high byte); and a packet check sum (low byte). As illustrated in the message structure table of FIG. 14, the "to" address, or message destination, may comprise from 1 to 6 bytes. The "from" address, or message source device, may be coded in a full 6 byte designator. Bytes 11 through 13 may be used by the system to concatenate messages of packet lengths greater than 256 bytes. Byte 14 may comprise a command byte. Byte 14 may be used in conjunction with bytes 15 through 30 to communicate information as required by DCCMS 200 specific commands. Bytes 31 and 32 may comprise packet check sum bytes. The packet check sum bytes may be used by the system to indicate when system messages are received with errors. Bytes 31 and 32 may be shifted in the message to replace bytes 15 and 16 for commands that require only one byte. The order of appearance of specific information within the message protocol of FIG. 14 generally remains fixed although the byte position number in individual message transmissions may vary due to scalability of the "to" address, the command byte, and the data portion of the message.

Having described the general message structure of a message that may be sent via the DCCMS 200 of the present invention, reference is directed to FIG. 15, which illustrates three sample messages. The first message 1500 illustrates the broadcast of an emergency message "FF" from a central server with an address "0012345678" to a personal transceiver with an address of "FF".

The second message 1510 illustrates how the first message might be sent to an RF transceiver that functions as a repeater. Emergency message "FF" from a central server with address "0012345678" is first sent to transceiver "FO". The second message, further contains additional command data "A000123456" that may be used by the system to identify further transceivers to send the signal through on the way to a destination device.

The third message 1515 illustrated in FIG. 15 reveals how the message protocol of the various embodiments of the present invention may be used to "ping" a remote RF transceiver 220 (FIG. 2) to determine a transceiver's health or status. Source unit "E112345678" originates a ping request by sending command "08" to a transceiver identified as "A012345678". The response to the ping request can be as simple as reversing the "to address" and the "from address" of the command, such that, a healthy transceiver will send a ping message back to the originating device. The system of the present invention may be configured to expect a return ping within a specific time period. Operators of the present invention could use the delay between the ping request and the ping response to model system loads and to determine if specific DCCMS 200 parameters might be adequately monitored and controlled with the expected feedback transmission delay of the system.

One or more specific types of RF transceivers may be integrated within the DCCMS 200 of the present invention. For example, one RF transceiver that may be used is the TR1000, manufactured by RF Monolithics, Inc. As is known, the TR1000 hybrid transceiver is well suited for short range, wireless data applications where robust operation, small size, low power consumption, and low-cost are desired. All critical RF functions are contained within the single hybrid chip, simplifying circuit design and accelerating the design-in process. The receiver section of the TR1000 is sensitive and stable. A wide dynamic range log detector, in combination with digital automatic gain control (AUC) provides robust performance in the presence of channel noise or interference. Two stages of surface acoustic wave (SAW) filtering provide excellent receiver out-of-band rejection. The transmitter of the TR1000 includes provisions for both on-off keyed (OOK) and amplitude-shift key (ASK) modulation. The transmitter or the TR1000 employs SAW filtering to suppress output harmonics, for compliance with FCC and other regulations. Additional details of the TR1000 transceiver need not be described herein, because the present invention is not limited by the particular choice of transceiver. Further details of the TR1000 transceiver may be obtained through data sheets, and application notes, design guides (e.g., the "ASH Transceiver Designers Guide").

Numerous other RF transceivers may be implemented in accordance with the embodiments of the present invention. Such other transceivers may include other 900 MHz transceivers, as well as transceivers at other frequencies. In addition, infrared, ultrasonic, and other types of transceivers may be employed, consistent with the embodiments of the present invention.

It should be appreciated that, in some implementations, the transceiver ID is not necessary to identify the location of the transceiver 400. Indeed, in implementations where the transceiver is permanently integrated into an alarm sensor other stationary device within a system, then the control system application server 205 and/or the local gateway 240 may be configured to identify the transmitter location by the transmitter identifier alone. It will be appreciated that, in embodiments that do not utilize RF transceiver/repeaters 220, the RF transmitters 235 and/or RF transceivers 225 may be configured to transmit at a higher power level to effectively communicate with the local gateway 240.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

I claim:

1. A condition detector composing:
   a sensor to provide an alarm signal upon detecting a condition;
   a communication device having a unique address, to wirelessly transmit the alarm signal by formatting the alarm signal into a packet, the packet comprising a packet length indicator indicating the number of bytes in the packet; a total packet indicator indicating the number of packets in a message; and a current packet indicator to distinguish one packet from another packet; and
   a gateway geographically remote from the communication device to receive the wireless alarm signal packet and transmit the alarm signal via a WAN to a monitoring device, the monitoring device being adapted to receive the alarm signal.

2. The detector of claim 1, the packet including: a receiver address comprising a scalable address of the monitoring device; a sender address comprising the unique address of the communication device; a command indicator comprising a command code; at least one data value comprising a scalable message; and an error detector that is a redundancy check error detector.

3. The detector of claim 1, wherein the sensor is at least one of a photodetection smoke sensor and an ionizing smoke detector.

4. The detector of claim 3, further comprising an alarm to emit at least one of an audible alarm and a visual alarm upon receiving the alarm signal.

5. The detector of claim 1, wherein the packet further comprises:
   a preface having a predetermined sequence including a first logic level and a subsequent sequence including at least two bytes of a second logic level; and
   a postscript comprising a low voltage output.

6. The detector of claim 1, wherein the communication device is a radio frequency transceiver.

7. The detector of claim 1, wherein the communication device transmits the alarm signal using digital modulation.

8. A smoke detection system comprising:
   a monitoring station; and
   a plurality of smoke detectors each having a unique identifier and each adapted to wireless sly transmit an alarm signal to the monitoring station by formatting the alarm signal into a packet,
   the packet including: a receiver address comprising a scalable address of the monitoring station; a sender address comprising the unique identifier of a smoke detector; a command indicator comprising a command code; at least one data value comprising a scalable message; and an error detector that is a redundancy check error detector.

9. The system of claim 8, wherein each of the smoke detectors comprise a smoke sensor and a communication device, the smoke sensor providing the alarm signal upon detecting smoke and the communication device formatting the alarm signal into the packet and transmitting the packet.

10. The system of claim 8, further comprising a gateway to receive the alarm signal and to provide the alarm signal to the monitoring station, wherein the gateway receives the packet, configures the packet into a data format for the monitoring station, and transmits the configured packet to the monitoring station via a wide area network.

11. The system of claim 8, wherein each of the smoke detectors comprise a radio frequency transceiver to wirelessly transmit the alarm signal.

12. The system of claim 8, further comprising a gateway having a memory, the gateway to receive the alarm signal and to determine which smoke detector transmitted the alarm signal based at least partially on the unique identifiers for the smoke detectors.

13. The system of claim 8, the smoke detectors each comprising a transceiver, wherein each transceiver communicates with at least one of the other transceivers.

14. The system of claim 8, wherein the smoke detectors transmit the alarm signal using digital modulation.

15. The system of claim 8, wherein the monitoring station transmits control signals to at least one of the smoke detectors to control the operations of the at least one smoke detector.

16. A smoke detection system comprising:
   a plurality of smoke detectors each having a unique address;
   a gateway;
   a monitoring station;
   wherein at least one of the plurality of smoke detectors wirelessly transmits an alarm signal over a radio frequency network to the gateway as a packet, the packet including: a receiver address comprising a scalable address of the monitoring station; a sender address comprising the unique address of a smoke detector transmitting the alarm signal; a command indicator comprising a command code; at least one data value comprising a scalable message; and an error detector that is a redundancy check error detector; and
   wherein the gateway is adapted to receive the alarm signal from the smoke detector transmitting the alarm signal, configure the alarm signal for transmission over a wide area network, and transmit the alarm signal over the wide area network to the monitoring station.

17. The system of claim 16, wherein the packet further comprises:
   a packet length indicator indicating the number of bytes in the packet;
   a total packet indicator indicating the number of packets in a message; and
   a current packet indicator to distinguish one packet from another packet.

18. The system of claim 17, wherein the alarm signal transmission is a low powered radio frequency transmission and is transmitted using digital modulation.

19. The system of claim 16, wherein the smoke detectors comprise at least one of a photodetection smoke sensor and an ionizing smoke detector.

* * * * *

UNITED STATES PATENT AND TRADEMARK OFFICE
CERTIFICATE OF CORRECTION

Page 1 of 1

PATENT NO.         : 7,295,128 B2
APPLICATION NO.    : 11/119054
DATED              : November 13, 2007
INVENTOR(S)        : Thomas David Petite It is certified that error appears in the above-identified patent and that said Letters Patent is hereby corrected as shown below:

In the Claims:

Column 15, line 18, in the preamble to claim 1, the word "composing" should read --comprising--.

Signed and Sealed this
Seventh Day of January, 2014

Margaret A. Focarino
*Commissioner for Patents of the United States Patent and Trademark Office*